(12) United States Patent
Tatsumoto et al.

(10) Patent No.: US 9,207,622 B2
(45) Date of Patent: Dec. 8, 2015

(54) POWER CONTROLLER AND IMAGE FORMING APPARATUS

(71) Applicant: Konica Minolta, Inc., Chiyoda-ku (JP)

(72) Inventors: Yuhei Tatsumoto, Toyokawa (JP); Tomonobu Tamura, Toyokawa (JP); Satoshi Teshima, Okazaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/606,125

(22) Filed: Jan. 27, 2015

(65) Prior Publication Data
US 2015/0220044 A1      Aug. 6, 2015

(30) Foreign Application Priority Data

Feb. 4, 2014    (JP) .................................. 2014-019407

(51) Int. Cl.
*G03G 15/00* (2006.01)
*H02J 3/38* (2006.01)
*H02J 4/00* (2006.01)

(52) U.S. Cl.
CPC . *G03G 15/80* (2013.01); *H02J 3/38* (2013.01); *H02J 4/00* (2013.01)

(58) Field of Classification Search
CPC .............. G03G 15/80; H02J 3/38; H02J 4/00
See application file for complete search history.

(56) References Cited

U.S. PATENT DOCUMENTS

| | | | | |
|---|---|---|---|---|
| 3,489,915 A | * | 1/1970 | Engelhardt | ...................... 307/66 |
| 8,648,495 B2 | * | 2/2014 | Chou et al. | ....................... 307/66 |
| 2005/0105224 A1 | * | 5/2005 | Nishi | .............................. 361/18 |
| 2005/0198963 A1 | * | 9/2005 | Wai et al. | ......................... 60/698 |
| 2009/0000654 A1 | * | 1/2009 | Rotzoll et al. | ................. 136/244 |
| 2010/0283325 A1 | * | 11/2010 | Marcianesi et al. | ............. 307/82 |
| 2011/0125336 A1 | * | 5/2011 | Groves et al. | .................. 700/287 |
| 2011/0144822 A1 | * | 6/2011 | Choi | ............................. 700/297 |
| 2011/0304295 A1 | * | 12/2011 | McNally | ....................... 320/101 |
| 2012/0112546 A1 | * | 5/2012 | Culver | ............................ 307/66 |
| 2013/0038130 A1 | * | 2/2013 | Lai | ................................... 307/80 |
| 2013/0113437 A1 | * | 5/2013 | Ishibashi et al. | .............. 320/136 |
| 2013/0127394 A1 | | 5/2013 | Kai et al. | |
| 2013/0249298 A1 | * | 9/2013 | Dong et al. | ...................... 307/80 |
| 2013/0314022 A1 | * | 11/2013 | Ishibashi | ....................... 320/101 |

(Continued)

FOREIGN PATENT DOCUMENTS

| | | |
|---|---|---|
| JP | 2007-133765 A | 5/2007 |
| JP | 2008-138636 A | 6/2008 |

(Continued)

*Primary Examiner* — G. M. Hyder
(74) *Attorney, Agent, or Firm* — Buchanan Ingersoll & Rooney PC

(57) ABSTRACT

A power controller includes: a measuring unit that measures outputs from plural power generating devices outputting power to a common load in parallel; an adjusting unit that controls the outputs of the plural power generating devices to adjust output voltages of the plural power generating devices to a predetermined value; and a matching control unit that calculates power-voltage characteristics of the plural power generating devices based on values measured by the measuring unit, determines a target value of output voltage to be shared by all the plural power generating devices based on the power-voltage characteristics thus calculated and corresponding to the whole parallel connection of the plural power generating devices, and allows the adjusting unit to match the predetermined value with the target value.

18 Claims, 20 Drawing Sheets

(56) References Cited

U.S. PATENT DOCUMENTS

2014/0306533 A1* 10/2014 Paquin et al. .................. 307/52
2015/0069950 A1* 3/2015 Ishibashi et al. .............. 320/101
2015/0109133 A1* 4/2015 Andre ........................... 340/657
2015/0186904 A1* 7/2015 Guha et al.

FOREIGN PATENT DOCUMENTS

| | | |
|---|---|---|
| JP | 2013-25280 A | 2/2013 |
| JP | 2013-101500 A | 5/2013 |
| JP | 2013-110865 A | 5/2013 |

* cited by examiner

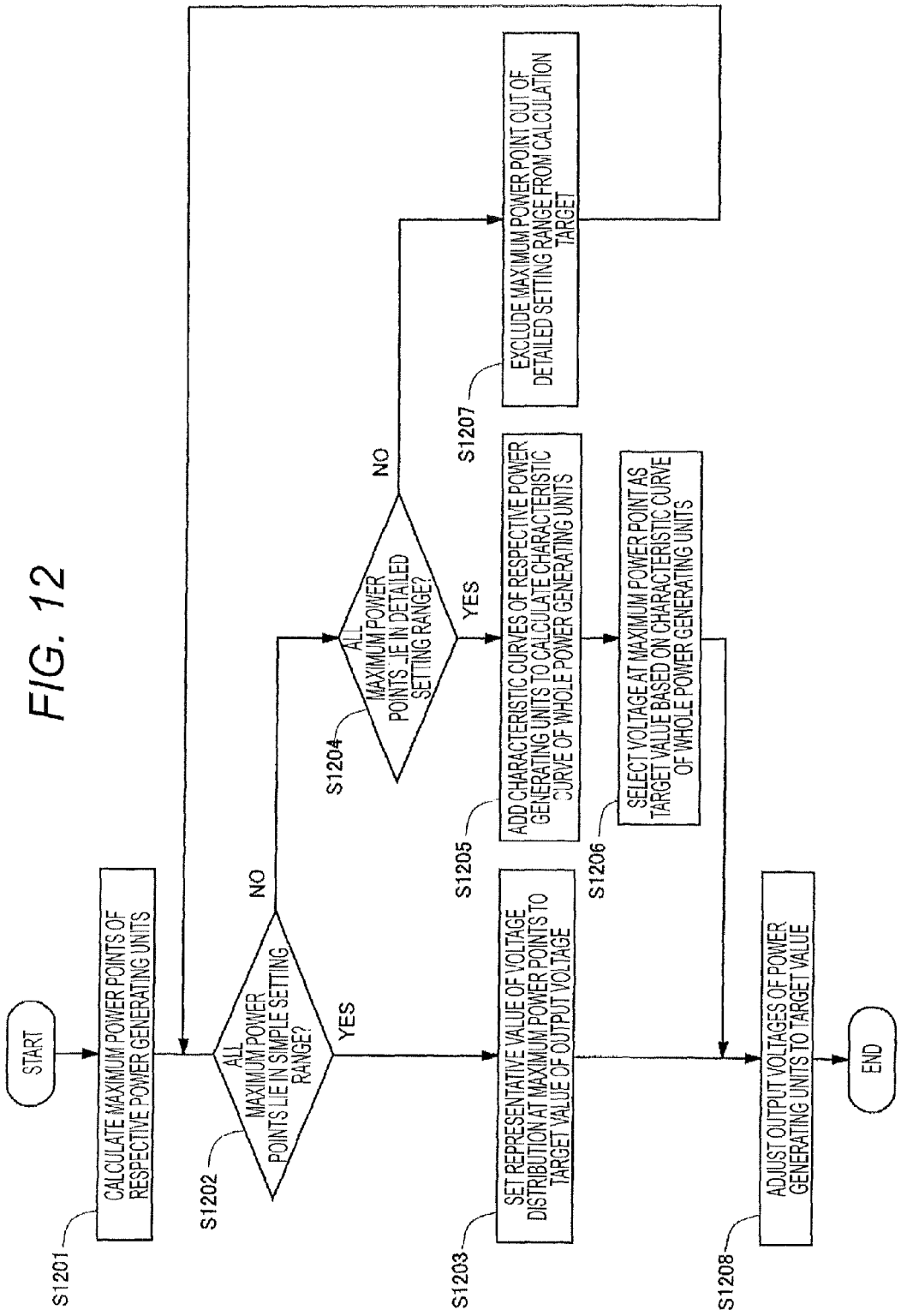

| MAXIMUM POWER POINT | FIRST THERMAL POWER GENERATING UNIT | SECOND THERMAL POWER GENERATING UNIT | WHOLE POWER GENERATING UNITS |
|---|---|---|---|
| VOLTAGE [V] | 1.3 | 0.8 | 1.1 |
| POWER [mW] | 245 | 90.0 | 315 |

| | TYPE (I) | TYPE (II) | TYPE (III) |
|---|---|---|---|
| POWER [mW] | 315 | 335 | 245 |
| PERCENTAGE | 94 | 100 | 73 |

FIG. 15

| OPERATION MODE | FIRST THERMAL POWER GENERATING UNIT FIXING UNIT | SECOND THERMAL POWER GENERATING UNIT DISCHARGE TRAY | OSCILLATION POWER GENERATING UNIT FEEDING UNIT | LIGHT POWER GENERATING UNIT ADF UPPER SURFACE |
|---|---|---|---|---|
| SLEEP | × | × | × | ○ |
| RUN | ○ | ○ | ○ | ○ |
| STANDBY | ○ | × | × | ○ |

POWER CONTROLLER AND IMAGE FORMING APPARATUS

The entire disclosure of Japanese Patent Application No. 2014-019407 filed on Feb. 4, 2014 including description, claims, drawings, and abstract are incorporated herein by reference in its entirety.

BACKGROUND OF THE INVENTION

1. Field of the Invention

The present invention relates to a technology for controlling power output from a power generating device, and more particularly to a control technology for plural interconnected power generating devices.

2. Description of the Related Art

Recently, technologies for realizing use of energy harvesting power generating devices in various types of systems are under development. The "power generating devices" is a general term referring to devices which generate electric energy from other energies such as kinetic energy, thermal energy, light energy, electromagnetic energy, and chemical energy, including turbine generators, thermoelectric conversion elements, solar cells, fuel cells, oscillation power generating elements, and electromagnetic power generating elements. The "energy harvesting" refers to a technology which collects natural energies such as solar energy, wind power energy, hydraulic power energy, and geothermal energy, or energies such as oscillation energy, thermal energy, light energy, and electromagnetic energy released from a certain system to the surrounding environment, and reuses these energies collected as power. For example, an image forming apparatus disclosed in JP 2013-025280 A collects waste heat released from a fixing unit by using thermoelectric conversion elements, and reuses the collected power for driving of an exhaust fan or for temperature retention or heating of the fixing unit. In addition, there is known a portable wireless communicator which collects oscillation given to the communicator by using oscillation power generating elements, and reuses the collected power as auxiliary power supply for avoiding battery exhaustion, for example.

Maximum power point tracking (MPPT) control is known as a technology for maintaining high power generation efficiency of a power generating device. The "maximum power point" corresponds to a peak which appears in power-voltage characteristics of a general power generating device. When output voltage of a power generating device is equivalent to voltage at the maximum power point, power output from the power generating device becomes the maximum. The maximum power point considerably varies in accordance with fluctuations of the environmental conditions. For example, maximum power points of thermoelectric conversion element and fuel cells are dependent on temperatures, while maximum power points of solar cells are dependent on volumes of sunshine duration. According to MPPT control, variations of the maximum power point are calculated from measurements of the environmental conditions such as temperatures and volumes of sunshine duration, or from fluctuations of output from a power generating device. Then, the output of the power generating device is adjusted to follow the calculated variations of the maximum power point. According to MPPT control disclosed in JP 2008-138636 A, for example, the maximum power point is calculated from measurements of wind velocity by using a relational expression between wind velocity and maximum power point. Then, output voltage of a wind turbine generator is adjusted to voltage corresponding to the calculated maximum power point. According to MPPT control disclosed in JP 2013-101500 A and JP 2007-133765 A, the product of voltage and current of output from a solar cell, i.e., output power is calculated every time voltage and current of output from the solar cell are measured. Then, the output of the solar cell is adjusted such that the current value of the product becomes larger than the product calculated immediately before the current product. In any types of the foregoing MPPT controls, the output of the power generating device is maintained at the maximum power point, wherefore the power generation efficiency is maintained at a high level.

In practical application, a plurality of power generating devices are equipped in a system and interconnected with one another within the system. Particularly, in case of an energy harvesting power generating device, the amount of power generated from a single power generating device is small, or the stability of operation for fluctuations of environmental conditions is insufficient. Accordingly, a system intended to include a power generating device generally carries plural power generating devices, particularly such power generating devices having different operational characteristics for environmental conditions, such as solar cells, radio wave power generation circuits, and thermoelectric conversion elements, in a manner interconnected with one another within the system. According to a control system disclosed in JP 2013-110865 A, for example, oscillation and heat generated from an automobile, and sunlight and electromagnetic waves received by the automobile are collected as power by using various types of power generating devices mounted on the single automobile. This structure supplies a sufficient amount of power from the whole power generating devices, and maintains this amount of power with sufficient stability regardless of fluctuations of the environmental conditions.

The followings are known as technologies capable of improving power generation efficiency of a system including plural interconnected power generating devices, for example. The system disclosed in JP 2008-138636 A individually performs MPPT control for each of plural wind turbine generators, and extracts power from a power generator having the highest voltage at the maximum power point. The system disclosed in JP 2013-101500 A individually performs MPPT control for each of strings during interconnected operation between plural solar cell strings and external power systems, and adjusts output voltages of all the strings to a uniform voltage during independent operation of the strings isolated from the external power systems. The uniform output voltage is adjusted such that the power consumption by loads can be covered by the total sum of the power outputs from the respective strings, wherefore concentration of the burden only on any one of the strings is avoidable. The system disclosed in JP 2007-133765 A individually measures output characteristics of solar cell modules corresponding to interconnection targets. When voltage of any one of the modules at the maximum power point does not reach a lower limit of input voltage of an inverter disposed downstream, modules in similar situations and having the same current at the maximum power point are connected in series. Then, the synthesized output is input to the inverter. In addition to the foregoing technologies, the followings are considered as easy control technologies to be put into practice: (1) selecting a power generating device which generates the largest amount of power at the maximum power point, and supplying only the output from the corresponding power generating device to loads; and (2) adjusting output voltages of all power generating devices to voltage of a power generating device which generates the largest amount of power at the maximum power point.

In any cases of the foregoing technologies, it is obvious that the total sum of the amounts of power extracted from the whole power generating devices is smaller than the amount of power generated from the whole power generating devices. For example, the system disclosed in JP 2008-138636 A does not extract power from the power generating devices other than the power generating device having the highest voltage at the maximum power point. According to the system disclosed in JP 2013-101500 A, the uniform output voltage at the time of independent operation is generally different from each voltage of the strings at the maximum power point. As apparent, any of the foregoing technologies can extract not the entire amount of power generated from the respective power generating devices, but only a part of the amount of the power. Accordingly, the power generation efficiency is expected to further improve when the amount of power extracted from the whole power generating devices increases. However, no specific method for increasing the amount of extracted power is known, nor is obvious even for those skilled in the art.

For realizing extraction of the maximum amount of power allowed to be generated from all power generating devices, the following method may be adopted only for achieving this purpose. MPPT control is individually performed for each of the power generating devices to extract power at voltages corresponding to the respective maximum power points from the power generating devices. Then, the respective voltages are adjusted to a common voltage by using constant voltage circuits. According to this method, constant voltage circuits as many as the power generating devices are needed, wherefore it is difficult to further decrease the scale of the whole system which controls the power of the respective power generating devices. This situation is undesirable in consideration that further reduction of the manufacturing cost of the system becomes difficult.

SUMMARY OF THE INVENTION

It is an object of the present invention to solve the aforementioned problems, particularly to provide a power controller capable of increasing the amount of power allowed to be extracted from whole plural power generating devices without enlarging the scale of the structure.

To achieve the abovementioned object, according to an aspect, a power controller reflecting one aspect of the present invention is a device for controlling power output from plural power generating devices to a common load in parallel, and comprises a measuring unit, an adjusting unit, and a matching control unit. The measuring unit measures outputs from the plural power generating devices. The adjusting unit controls the outputs of the plural power generating units to adjust output voltages of the plural power generating devices to a predetermined value. The matching control unit calculates power-voltage characteristics of the plural power generating devices based on values measured by the measuring unit, determines a target value of output voltage to be shared by all the plural power generating devices based on the power-voltage characteristics thus calculated and corresponding to the whole parallel connection of the plural power generating devices, and allows the adjusting unit to match the predetermined value with the target value.

The target value is preferably equivalent to the value of the output voltage to be shared by all the plural power generating devices when the total amount of power output from the plural power generating devices to the load in parallel becomes the maximum.

The matching control unit preferably selects calculation to be used in determining the target value in accordance with distribution of maximum power points of the plural power generating devices based on the calculated power-voltage characteristics. The matching control unit preferably selects calculation of a representative value in the distribution of the maximum power points as the calculation when the distribution lies within a first range, and determines the target value based on the representative value. The matching control unit preferably selects addition of the calculated power-voltage characteristics and executes practical calculation of power-voltage characteristics of the whole parallel connection of the plural power generating devices as the calculation when the distribution exceeds the first range and expands from the first range, and determines the target value based on a voltage value at the maximum power point indicated by the power-voltage characteristics of the whole parallel connection. The matching control unit preferably excludes from the plural power generating devices a power generating device whose power-voltage characteristics indicate the maximum power point lying outside a second range when the distribution exceeds the second range wider than the first range and expands from the second range, and selects calculation to be used in determining the target value in accordance with distribution of maximum power points of the remaining power generating devices.

The matching control unit preferably adds the calculated power-voltage characteristics regardless of distribution of the maximum power points to make practical calculation of power-voltage characteristics of the whole parallel connection of the plural power generating devices, and determines the target value based on a voltage value at the maximum power point indicated by the power-voltage characteristics of the whole parallel connection.

The matching control unit preferably selects from the plural power generating devices a power generating device whose output to the load is to be stopped in accordance with an operation mode of a system incorporating the plural power generating devices, and gives the adjusting unit an instruction indicating the selected power generating device.

The system is preferably an image forming apparatus. In this case, the power controller is preferably used when the plural power generating devices include a power generating device provided at a driving portion of the image forming apparatus where the driving state of the driving portion is variable in accordance with the operation mode of the image forming apparatus.

To achieve the abovementioned object, according to an aspect, an image forming apparatus reflecting one aspect of the present invention comprises a feeding unit, an image forming unit, a fixing unit, an operation control unit, plural power generating units, a power control unit, and an output unit. The feeding unit feeds plural sheets sheet by sheet. The image forming unit forms a toner image on a sheet fed by the feeding unit based on image data. The fixing unit fixes the toner image on the sheet by heat. The operation control unit supplies the image data to the image forming unit. The plural power generating units include elements for converting heat, light, radio waves, or oscillation into power, and generate power by using waste heat generated from the fixing unit, light applied from the outside, radio waves transmitted through a space around the elements, or oscillation of the feeding unit The power control unit controls power output from the plural power generating units in parallel. The output unit accumulates or outputs the power.

The power controller includes a measuring unit, an adjusting unit, and a matching control unit. The measuring unit measures outputs from plural power generating devices outputting power to a common load in parallel. The adjusting unit controls the outputs of the plural power generating units to adjust output voltages of the plural power generating devices to a predetermined value. The matching control unit calculates power-voltage characteristics of the plural power generating devices based on values measured by the measuring unit, determines a target value of output voltage to be shared by all the plural power generating devices based on the power-voltage characteristics thus calculated and corresponding to the whole parallel connection of the plural power generating devices, and allows the adjusting unit to match the predetermined value with the target value.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 12 is a flowchart showing power control performed by the power control unit for the power generating units;

FIG. 15 is a table showing whether or not the respective power generating units are to be connected to the output unit in each of the operation modes illustrated in FIG. 7.

DESCRIPTION OF THE PREFERRED EMBODIMENTS

Hereinafter, an embodiment of the present invention will be described with reference to the drawings. However, the scope of the invention is not limited to the illustrated examples.

[Structure Outline of Image Forming Apparatus]

Figure 1:
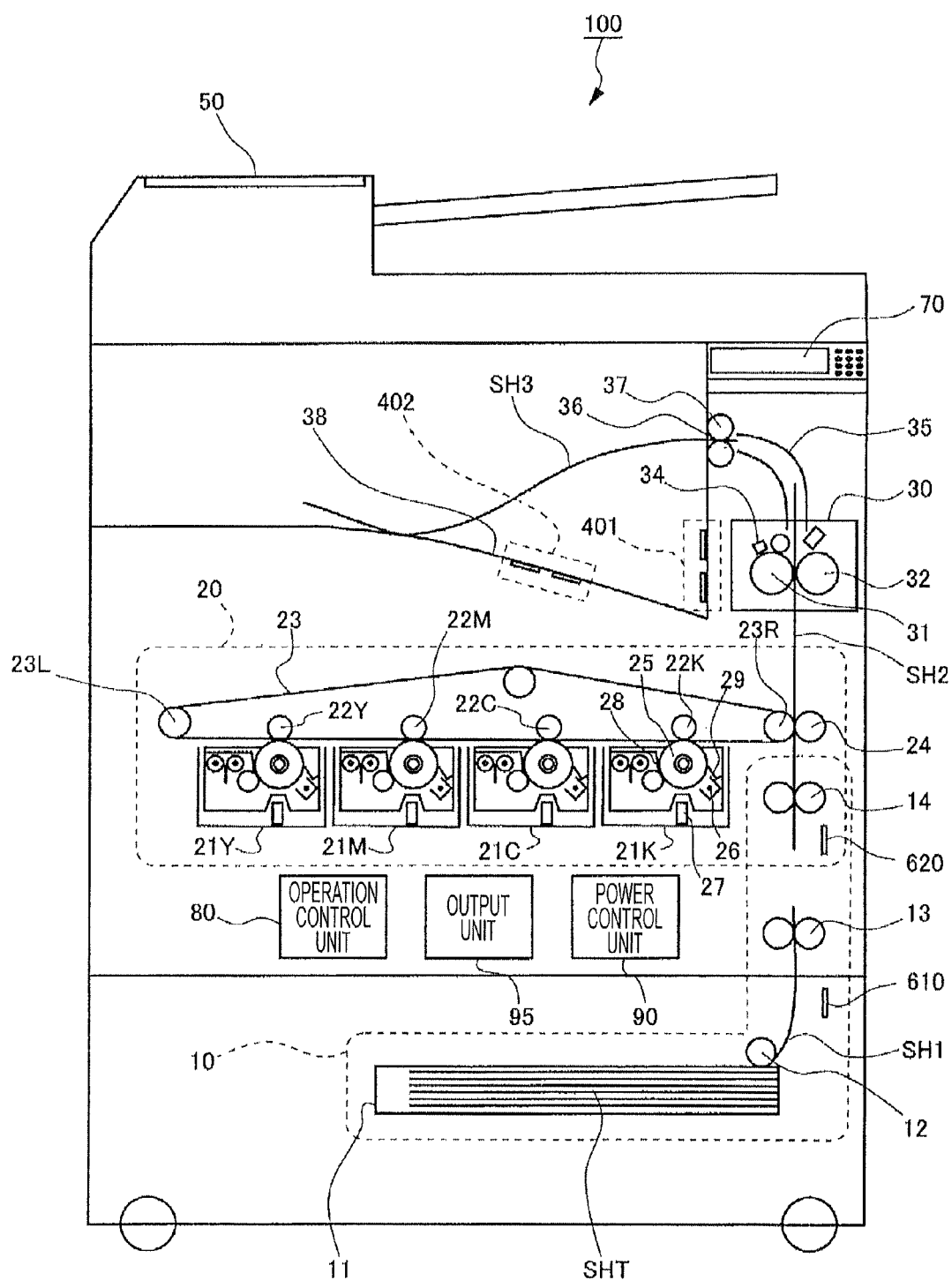
FIG. 1 is a front view schematically illustrating a structure of an image forming apparatus according to an embodiment of the present invention.

FIG. 1 is a front view schematically illustrating a structure of an image forming apparatus according to the embodiment of the present invention. FIG. 1 is a figure illustrating elements inside an image forming apparatus 100 as viewed through a front surface of a housing.

Referring to FIG. 1, the image forming apparatus 100 is a color laser printer, for example, and includes a feeding unit 10, an image forming unit 20, a fixing unit 30, plural power generating units 401, 402, 50, 610, and 620, an operation unit 70, an operation control unit 80, a power control unit 90, and an output unit 95. The feeding unit 10 feeds plural sheets SHT to the image forming unit 20 sheet by sheet. The image forming unit 20 forms toner images in four colors of yellow (Y), magenta (M), cyan (C), and black (K) on a sheet SH2 fed from the feeding unit 10 in accordance with image data. The fixing unit 30 fixes the toner images by heat. The plural power generating units 401 to 620 generate power by using heat, light, or oscillation around the power generating units 401 to 620. The operation unit 70 includes press buttons or a touch panel. The operation unit 70 receives an instruction of a job request from a user through operation of the press buttons or the touch panel, and transmits information on the instruction to the operation control unit 80. The operation unit 70 is further connected with a network via an external interface to receive a job request and image data from another electronic device on the network, and send the request and data to the operation control unit 80. The operation control unit 80, the power control unit 90, and the output unit 95 are electronic circuits mounted on a single substrate. The operation control unit 80 controls other elements within the image forming apparatus 100 based on the information received from the operation unit 70. In particular, the operation control unit 80 supplies image data to the image forming unit 20. The power control unit 90 controls power output from the respective power generating units 401 to 620. The output unit 95 accumulates or outputs the power. The output power is utilized as standby power or auxiliary power at the time of power failure by the operation unit 70, the operation control unit 80, or the power control unit 90, for example.

[Feeding Unit]

Referring to FIG. 1, the feeding unit 10 includes a storage tray 11, a delivering roller 12, a conveying roller 13, and a timing roller 14. The storage tray 11 contained in a lower part of the image forming apparatus 100 is configured to store the plural sheets SHT. The sheets SHT are made of paper, for example. The delivering roller 12 delivers a sheet SH1 included in the plural sheets SHT and located at the uppermost position toward the conveying roller 13. The sheet SH1 is further conveyed toward the timing roller 14 by the conveying roller 13. The timing roller 14 generally stops at the start of the conveyance, and starts rotation in response to a driving signal sent from the operation control unit 80. The sheet SH2 conveyed from the conveying roller 13 at the timing indicated by the driving signal is further delivered from the timing roller 14 toward the image forming unit 20.

[Image Forming Unit]

Referring to FIG. 1, the image forming unit 20 includes four image forming units 21Y, 21M, 21C, and 21K, four primary transfer rollers 22Y, 22M, 22C, and 22K, an intermediate transfer belt 23, and a secondary transfer roller 24. The image forming units 21Y to 21K are disposed in the horizontal direction at predetermined intervals. Each of the primary transfer rollers 22Y to 22K is so disposed as to face to the corresponding one of the image forming units 21Y to 21K in the vertical direction. The intermediate transfer belt 23 attached to two rollers 23L and 23R and extending therebetween rotates in accordance with rotations of the rollers 23L and 23R. The part of the intermediate transfer belt 23 extending in the horizontal direction passes between the image forming units 21Y to 21K and the primary transfer rollers 22Y to 22K. With rotation of the intermediate transfer belt 23, the respective parts of the intermediate transfer belt 23 on the front surface side sequentially come into contact with the primary transfer rollers 22Y to 22K. The secondary transfer roller 24 is disposed in parallel with the one roller 23R of the two rollers which the intermediate transfer belt 23 is attached to and extends therebetween, thereby positioning the intermediate transfer belt 23 between the secondary transfer roller 24 and the one roller 23R. The sheet SH2 conveyed from the timing roller 14 is inserted into the contact portion between the intermediate transfer belt 23 and the secondary transfer roller 24, i.e., a nip formed therebetween.

The four image forming units 21Y to 21K have similar structures, each including a photosensitive drum 25, an electrifier 26, an exposing unit 27, a developing unit 28, a cleaner 29, and an eraser lamp (not shown in FIG. 1). The outer circumference of the photosensitive drum 25 is surrounded by the electrifier 26 and other components. The electrifier 26 uniformly electrifies the outer circumferential surface of the photosensitive drum 25 at a portion thereof facing to the electrifier 26. The exposing unit 27 includes a light emitting element and a lens. This light emitting element is constituted by a laser diode, for example. The exposing unit 27 exposes the electrified portion of the outer circumferential surface of the photosensitive drum 25 by using the light emitting element and the lens. This exposure removes the charge in an area to which light is actually applied. The shape of this area is determined in accordance with the driving signal received from the operation control unit 80. The area from which the charge has been removed is left on the outer circumferential surface as an electrostatic latent image. The developing unit 28 applies toner to the electrostatic latent image in toner colors allocated to the respective image forming units 21Y to 21K to develop the latent image. The cleaner 29 removes remaining toner from the outer circumferential surface of the photosensitive drum 25 at a portion thereof immediately after the contact with the intermediate transfer belt 23. The eraser lamp uniformly applies light to the outer circumferential surface of the photosensitive drum 25 at a portion thereof facing to the eraser lamp to remove the charge from that portion.

Voltage is applied to the primary transfer rollers 22Y to 22K, wherefore electric fields are generated between the primary transfer rollers 22Y to 22K and the intermediate transfer belt 23. These electric fields allow transfer of toner images from the photosensitive drum 25 to the surface of the intermediate transfer belt 23. The image forming operation is executed by the four image forming units 21Y to 21K at timing shifted from one another in accordance with rotation of the intermediate transfer belt 23. As a result, the toner images in the allocated colors are sequentially transferred from the photosensitive drums 25 of the image forming units 21Y to 21K and multiplexed at the same position on the surface of the intermediate transfer belt 23 to overlap on each other at that position. Finally, a color toner image is formed on the surface of the intermediate transfer belt 23.

Voltage is applied to the secondary transfer roller 24, wherefore an electric field is generated between the secondary transfer roller 24 and the intermediate transfer belt 23. This electric field allows transfer of the color toner image on the intermediate transfer belt 23 to the surface of the sheet SH2 passing through the nip between the intermediate transfer belt 23 and the secondary transfer roller 24. Thereafter, the secondary transfer roller 24 conveys the sheet SH2 to the fixing unit 30.

[Fixing Unit]

The fixing unit 30 includes a fixing roller 31, a pressurizing roller 32, and a temperature sensor 34. The fixing roller 31 and the pressurizing roller 32 are disposed in parallel and in contact with each other. The sheet SH2 conveyed from the image forming unit 20 is inserted into the contact portion between the fixing roller 31 and the pressurizing roller 32, i.e., the fixing nip formed therebetween. The fixing roller 31 contains a heater constituted by a halogen lamp, and applies heat generated from the halogen lamp to the sheet SH2 at a portion thereof inserted into the fixing nip. On the other hand, the pressurizing roller 32 applies pressure to the corresponding portion of the sheet SH2 to press the sheet SH2 against the fixing roller 31. When the sheet SH2 at a portion where the toner image is formed by the image forming unit 20 is sandwiched at the fixing nip, the toner image is fixed onto the surface of the sheet SH2 by the heat generated from the fixing roller 31 and the pressure applied by the pressurizing roller 32. The temperature sensor 34 provided in the vicinity of the center of the fixing roller 31 measures the temperature of the fixing roller 31, and notifies the operation control unit 80 about the temperature. Based on the received measurements of the temperature, the operation control unit 80 controls the amount of generated heat, i.e., the temperature of the halogen lamp.

The sheet SH2 subjected to heat fixing treatment by the fixing unit 30 is guided by a guide plate 35 from the upper part of the fixing unit 30 toward a discharge port 36. A pair of discharge rollers 37 are provided before the discharge port 36 to discharge a sheet SH3 toward an external discharge tray 38.

[Power Generating Unit]

The power generating units 401 to 620 generate power from heat, light, or oscillation released from the image forming apparatus 100 to the surrounding environment by using energy harvesting elements. The power generating units includes the thermal power generating units 401 and 402, a light power generating unit 50, and the oscillation power generating units 610 and 620. The thermal power generating units 401 and 402 collect heat from the fixing unit 30 or the sheet SH3 on the discharge tray 38 as power by using thermoelectric conversion elements. The light power generating unit 50 collects external light or illumination light illuminating the upper surface of the image forming apparatus 100 as power by using a solar cell. The oscillation power generating units 610 and 620 collect oscillation of the feeding unit 10 as power by using oscillation power generating elements.

—Thermal Power Generating Unit—

Referring to FIG. 1, the thermal power generating units include the unit (first thermal power generating unit) 401 disposed on the outer surface of the housing of the image forming apparatus 100 at a position the inner side of which faces to the fixing unit 30, and the unit (second thermal power generating unit) 402 embedded in the upper surface of the discharge tray 38.

The portion of the image forming apparatus 100 where the first thermal power generating unit 401 is disposed is suited for a position of the thermoelectric conversion elements for the following two reasons. (A1) A sufficiently higher temperature than the room temperature is maintained in this area by waste heat generated from the fixing unit 30. Accordingly, high output power from the thermoelectric conversion elements is expected. (A2) The temperature of the fixing nip of the fixing unit 30 does not change even when the thermoelectric conversion elements absorb heat in this area. Accordingly, high quality of printing does not deteriorate by the use of the first thermal power generating unit 401.

The area of the upper surface of the discharge tray 38 where the second thermal power generating unit 402 is embedded is covered by the sheet SH3 discharged from the discharge port 36. The temperature of the sheet SH3 has been raised by the heat received from the fixing unit 30, wherefore the temperature of the second thermal power generating unit 402 is maintained sufficiently higher than the room temperature by the contact between the second thermal power generating unit and the sheet SH3. Accordingly, high output power from the thermoelectric conversion elements is expected.

Figure 2A:
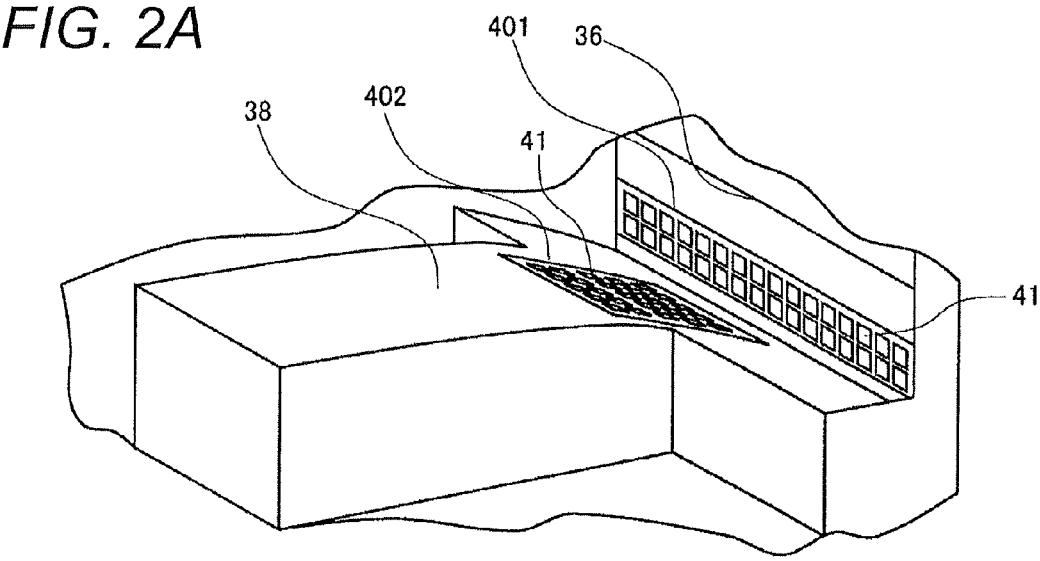
FIG. 2A is a perspective view schematically illustrating external appearances of thermal power generating units and the surroundings thereof illustrated in FIG. 1.

FIG. 2A is a perspective view schematically illustrating the external appearances of the thermal power generating units 401 and 402 and the surroundings thereof illustrated in FIG. 1. Referring to FIG. 2A, the surface of the housing of the image forming apparatus 100 vertically rises in an area below the discharge port 36, and crosses the end of the upper surface of the discharge tray 38 extending in the horizontal direction and smoothly curved toward below. The first thermal power generating unit 401 is disposed on the surface of the housing in the vicinity of the crossing portion between the surface of the housing and the upper surface of the discharge tray 38. The second thermal power generating unit 402 is embedded in the upper surface of the discharge tray 38 in the vicinity of the crossing portion. Plural thermoelectric conversion elements 41 are disposed in matrix on each of the thermal power generating units 401 and 402. The thermoelectric conversion elements 41 are connected in series by wiring in each of the thermal power generating units 401 and 402.

Figure 2B:
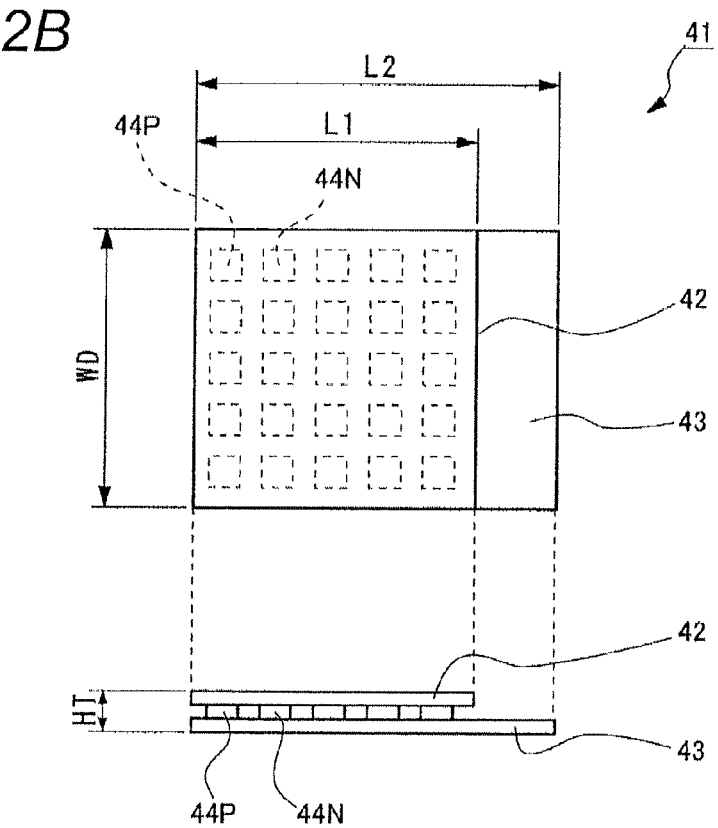
FIG. 2B is a top view and a side view of thermoelectric conversion elements illustrated in FIG. 2A.

FIG. 2B is a top view and a side view of the thermoelectric conversion elements 41 illustrated in FIG. 2A. Referring to FIG. 2B, the thermoelectric conversion elements 41 include two substrates 42 and 43, plural P-type semiconductor elements 44P, and N-type semiconductor elements 44N as many as the P-type semiconductor elements 44P. Each of the substrates 42 and 43 is constituted by a rectangular insulator, such as ceramic. The substrates 42 and 43 have an identical width WD. A length L1 of the one substrate 42 is shorter than a length L2 of the other substrate 43. The P-type semiconductor elements 44P and the N-type semiconductor elements 44N are bismuth (Bi)-tellurium (Te) system semiconductors to which a small amount of antimony (Sb) and selenium (Se) are added, respectively, for example. The semiconductor elements 44P and 44N are disposed in matrix between the two substrates 42 and 43, particularly in such an arrangement that each of the P-type semiconductor elements 44P is located adjacent to the N-type semiconductor elements 44N. While not shown in FIGS. 2A and 2B, a conductive layer is contained in each of the opposed surfaces of the two substrates 42 and 43. These conductive layers connect each upper end of the P-type semiconductor elements 44P with the upper end of an adjoining N-type semiconductor element 44N, and connect each lower end of the P-type semiconductor elements 44P with the lower end of another adjoining N-type semiconductor element 44N. This structure produces alternate series connection of all the P-type semiconductor elements 44P and the N-type semiconductor elements 44N.

Figure 3A:
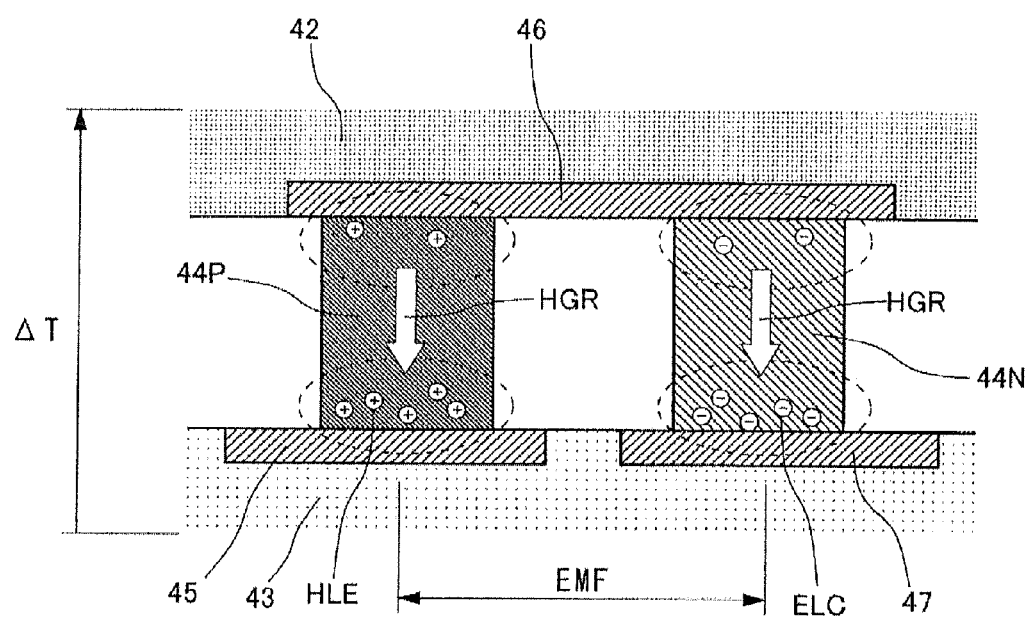
FIG. 3A is a cross-sectional view schematically illustrating a pair of semiconductor elements contained in the thermoelectric conversion elements, and the surroundings of the semiconductor elements illustrated in FIG. 2B.

FIG. 3A is a cross-sectional view schematically illustrating a pair of the semiconductor elements 44P and 44N included in the thermoelectric conversion elements 41 illustrated in FIG. 2B, and the surroundings of the semiconductor elements 44P and 44N. Referring to FIG. 3A, the one substrate 42 of the two substrates contacts the surface of the housing of the image forming apparatus 100 to absorb waste heat generated from the fixing unit 30 or the sheet SH3 on the discharge tray 38, while the other substrate 43 is exposed to the external space to discharge the received waste heat to the external space. In this case, a temperature difference $\Delta T$ is produced between the substrates 42 and 43, wherefore a thermal gradient appears in the inner space between the respective semiconductor elements 44P and 44N in the direction from the high-temperature substrate 42 toward the low-temperature substrate 43 as indicated by an arrow HGR in FIG. 3A. This thermal gradient allows carriers of the respective semiconductor elements 44P and 44N, i.e., holes HLE and electrons ELC to concentrate on the low-temperature side, wherefore a potential difference is produced between both ends of the respective semiconductor elements 44P and 44N (Seebeck effect). All the semiconductor elements 44P and 44N are connected in series via conductive layers 45, 46, and 47 of the substrates 42 and 43, wherefore the total sum of the potential differences between all the semiconductor elements 44P and 44N appears as electromotive force (EMF) at both ends of the series connection. This structure allows the thermoelectric conversion elements 41 to convert waste heat generated from the outside to direct current power.

Figure 3B:
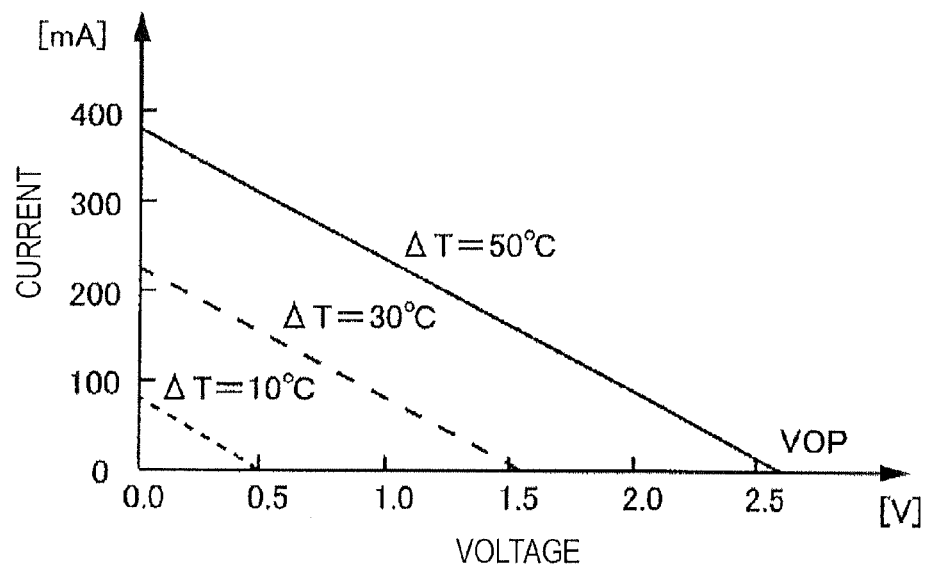
FIGS. 3B and 3C are graphs showing a current-voltage characteristic curve and a power-voltage characteristic curve, respectively, of the thermoelectric conversion elements illustrated in FIG. 2B.
Figure 3C:
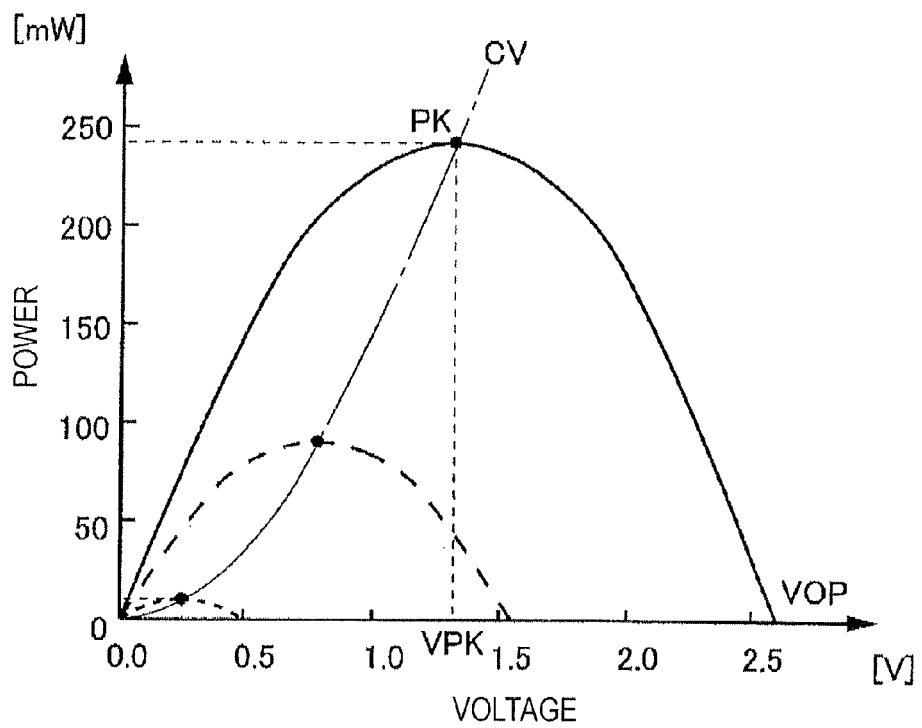

FIGS. 3B and 3C are graphs showing a current-voltage characteristic curve and a power-voltage characteristic curve, respectively, of the thermoelectric conversion elements 41. Referring to FIG. 3B, the thermoelectric conversion elements 41 decreases output current substantially (i.e., within tolerance) linearly in accordance with a rise of output voltage. Accordingly, as shown in FIG. 3C, the power-voltage characteristic curve is expressed substantially in the shape of an upward convex parabola. A vertex PK of the parabola, or a pair of a voltage value VPK and a current value at which the maximum power indicated by the vertex PK is output are referred to as a "maximum power point". The voltage value VPK at the maximum power point is substantially equivalent to 50% of an open circuit voltage VOP, i.e., VPK=VOP/2. The "open circuit voltage" in this context is a voltage value when the output ends of the thermoelectric conversion elements 41 are cut from a load and opened, and is equivalent to the voltage value VOP when the characteristic curves shown in FIGS. 3B and 3C cross coordinate axes of "current=0 [mA] and "power=0 [mW]" at points other than the origin. Referring further to FIGS. 3B and 3C, both the current-voltage characteristics and the power-voltage characteristics of the thermoelectric conversion elements 41 vary in accordance with the temperature difference ΔT between the two substrates 42 and 43. Accordingly, the maximum power point PK shifts along a dashed line CV shown in FIG. 3C in accordance with fluctuations of the temperature difference ΔT.

—Light Power Generating Unit—

Referring to FIG. 1, the light power generating unit 50 is embedded in the upper surface of an automatic document feeder (ADF) provided in the upper part of the image forming apparatus 100. The light power generating unit 50 converts external light or illumination light applied to the upper surface of the light power generating unit 50 into power using a solar cell.

Figure 4A:
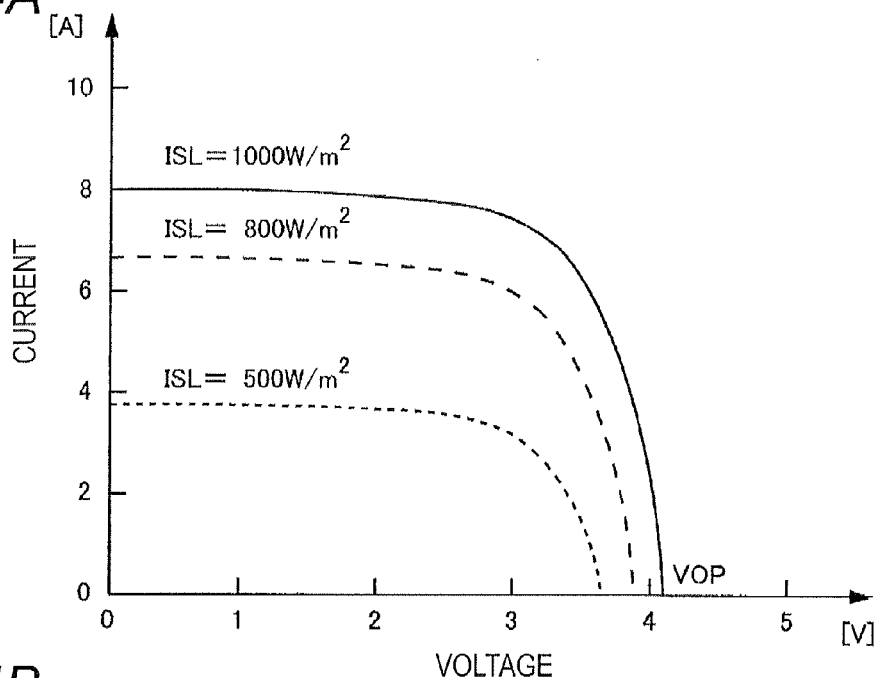
FIGS. 4A and 4B are graphs showing a current-voltage characteristic curve and a power-voltage characteristic curve, respectively, of a light power generating unit illustrated in FIG. 1.
Figure 4B:
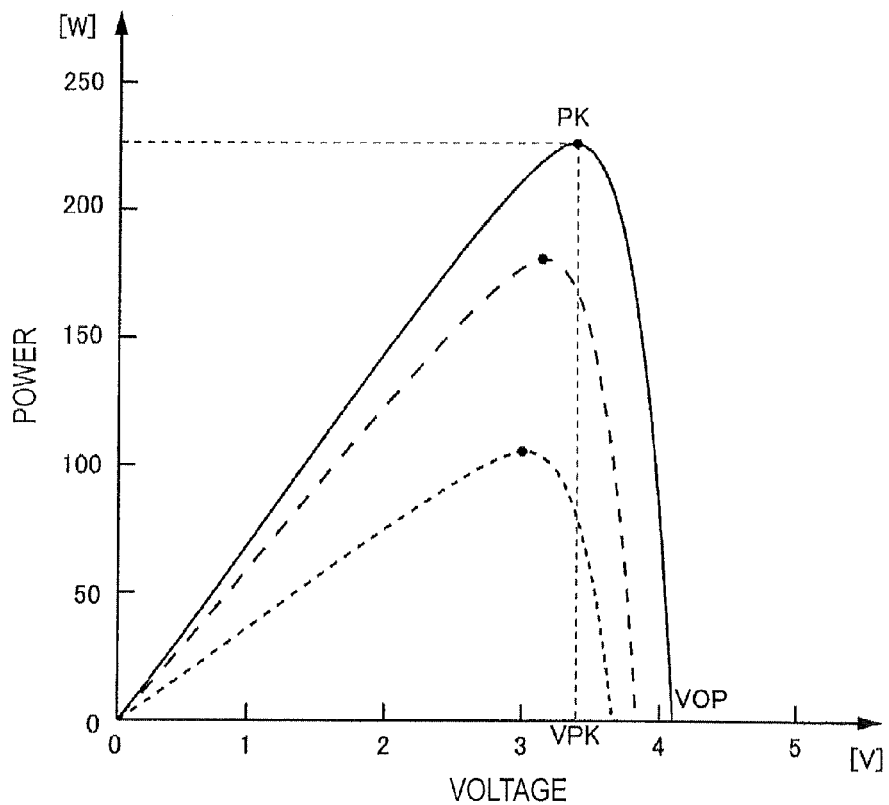

FIGS. 4A and 4B are graphs showing a current-voltage characteristic curve and a power-voltage characteristic curve, respectively, of a solar cell contained in the light power generating unit 50. Referring to FIG. 4A, the output current of the solar cell is maintained substantially constant in a wide range of the output voltage, and sharply decreases when the output voltage reaches a value close to the open circuit voltage VOP (such as value 0.6 to 0.7 times higher than open circuit voltage VOP). Accordingly, when the output voltage reaches the value VPK relatively close to the open circuit voltage VOP, the maximum power point PK appears as illustrated in FIG. 4B. Referring further to FIGS. 4A and 4B, both the current-voltage characteristics and the power-voltage characteristics of the solar cell vary in accordance with an incident light amount ISL, wherefore the maximum power point PK shifts in accordance with fluctuations of the incident light amount ISL.

—Oscillation Power Generating Unit—

Referring to FIG. 1, the oscillation power generating unit includes the unit (first oscillation power generating unit) 610 disposed in the vicinity of the storage tray 11 of the feeding unit 10, and the unit (second oscillation power generating unit) 620 disposed in the vicinity of the image forming unit 20. These areas containing both the units 610 and 620 are considerably oscillated every time the sheets SH1 and SH2 are conveyed by the feeding unit 10 from the storage tray 11 to the image forming unit 20 in accordance with driving of the respective rollers 12, 13, and 14. Accordingly, output power from the oscillation power generating units 610 and 620 are sufficiently high.

Figure 5A:
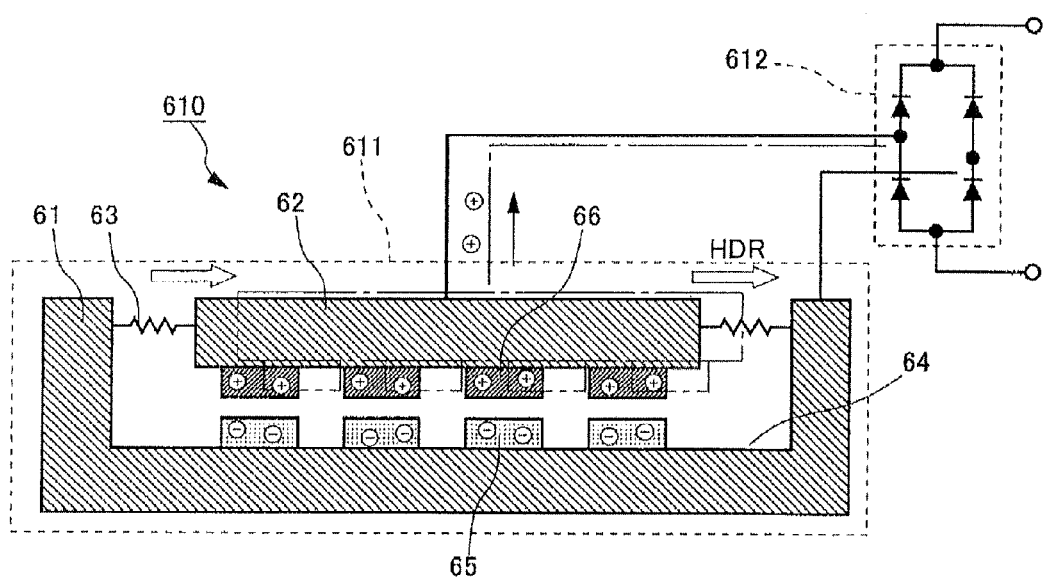
FIG. 5A is a view schematically illustrating a structure of an oscillation power generating unit illustrated in FIG. 1.

FIG. 5A is a view schematically illustrating the structure of the first oscillation power generating unit 610. The second oscillation power generating unit 620 has a similar structure, wherefore only the first oscillation power generating unit 610 is discussed as an example of the structure of the oscillation power generating unit. Referring to FIG. 5A, the first oscillation power generating unit 610 is of an electrostatic induction type, and contains an oscillation power generating element 611 and a rectifier circuit 612.

The oscillation power generating element 611 contains a base 61, a movable unit 62, and support members 63. These components are assembled into one piece semiconductor substrate by using a semiconductor integrated technology (MEMS process). The base 61 corresponds to the semiconductor substrate, and contains a concave portion 64 in the upper surface of the base 61. Plural belt-shaped electrets 65 are formed in the bottom surface of the concave portion 64 at equal intervals in the direction perpendicular to the longitudinal direction of the electrets 65 (corresponding to the direction perpendicular to the sheet surface of FIG. 5A). The "electrets" in this context refer to dielectrics which semipermanently retain electric polarization even after removal of an external electric field, and particularly to dielectrics which generate relatively intensive electric fields around the dielectrics. The movable unit 62 is a plate-shaped component, and is supported in a floating condition within the concave portion 64 of the base 61 by connection between the ends of the movable unit 62 and the upper surface of the base 61 via the support members 63. Plural belt-shaped electrodes 66 are disposed on the lower surface of the movable unit 62 at equal intervals in the direction perpendicular to the longitudinal direction, and face to the corresponding electrets 65. Electric fields generated by the charges within the electrets 65 cause electrostatic induction on the electrodes 66, wherefore charges having the polarity opposite to the polarity of the charges within the electrets 65 accumulate on the surfaces of the electrodes 66. The support members 63 are springs which support the movable unit 62 in a floating condition within the concave portion 64 of the base 61 such that the movable unit 62 can oscillate in the direction parallel with the bottom surface of the concave portion 64. When the oscillation power generating element 611 receives oscillation from the outside, the movable unit 62 oscillates in a direction indicated by an arrow HDR in FIG. 5A, wherefore the electrodes 66 on the lower surface of the movable unit 62 shift relative to the electrets 65. In this case, the electric fields on the electrodes 66 generated by the electrets 65 vary, which rearranges the charges on the surface of the electrodes 66. As a result, electromotive force PW is produced on the electrodes 66 by the rearrangement. The polarity of the electromotive force PW reverses in synchronization with the oscillation of the movable unit 62. The rectifier circuit 612 which connects the base 61 and the movable unit 62 of the oscillation power generating element 611 converts alternating current generated by the electromotive force PW into direct current, and outputs the direct current.

Figure 5B:
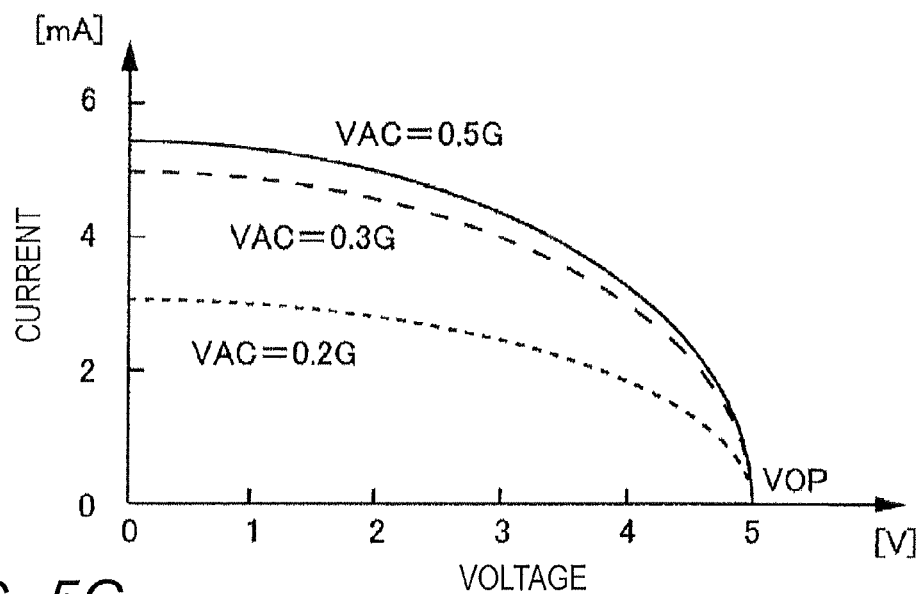
FIGS. 5B and 5C are graphs showing a current-voltage characteristic curve and a power-voltage characteristic curve, respectively, of an oscillation power generating element contained in the oscillation power generating unit.
Figure 5C:
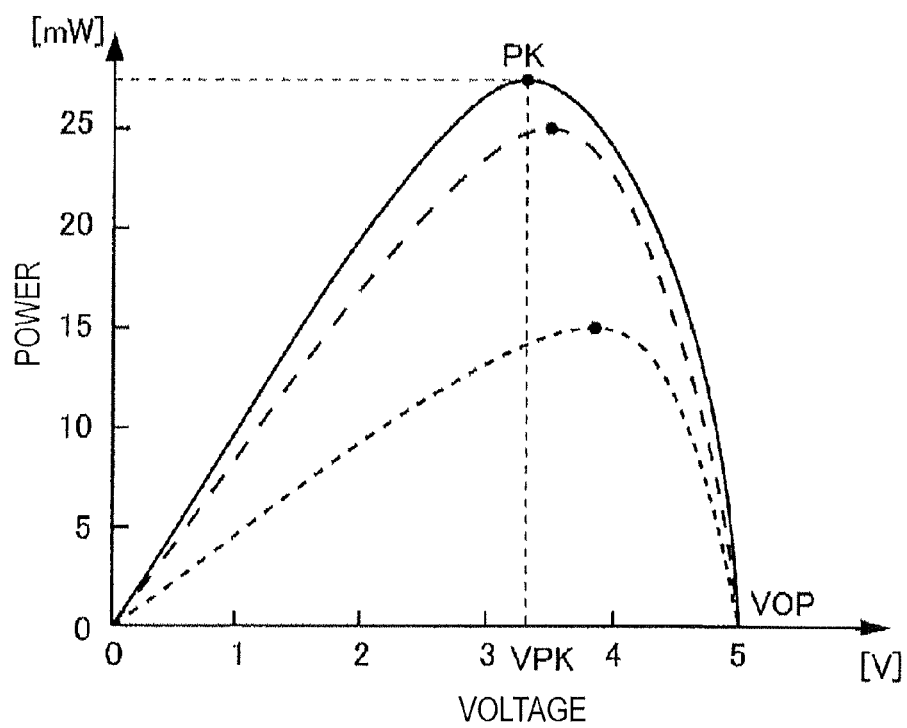

FIGS. 5B and 5C are graphs showing a current-voltage characteristic curve, and a power-voltage characteristic curve, respectively, of the oscillation power generating element 611. Referring to FIG. 5B, the output current of the oscillation power generating element 611 decreases as the output voltage of the oscillation power generating element 611 rises. The decreasing speed of the output current increases as the output voltage becomes higher. Accordingly, as shown in FIG. 5C, the maximum power point PK appears when the output voltage reaches the value VPK relatively close to the open circuit voltage VOP. Referring further to FIGS. 5B and 5C, both the current-voltage characteristics and the power-voltage characteristics of the oscillation power generating element 611 vary in accordance with a level VAC of oscillation from the outside, wherefore the maximum power point PK shifts in accordance with fluctuations of the level.

[Operation Control Unit]

The operation control unit 80 includes a CPU, a RAM, and a ROM. The CPU controls other function units included in the image forming apparatus 100 under firmware. The RAM provides a work area for the CPU at the time of execution of the firmware. The ROM contains a non-writable memory and a rewritable memory, such as EEPROM. The former stores the firmware, while the latter provides a storage area for environment variables and the like for the CPU.

Figure 6:
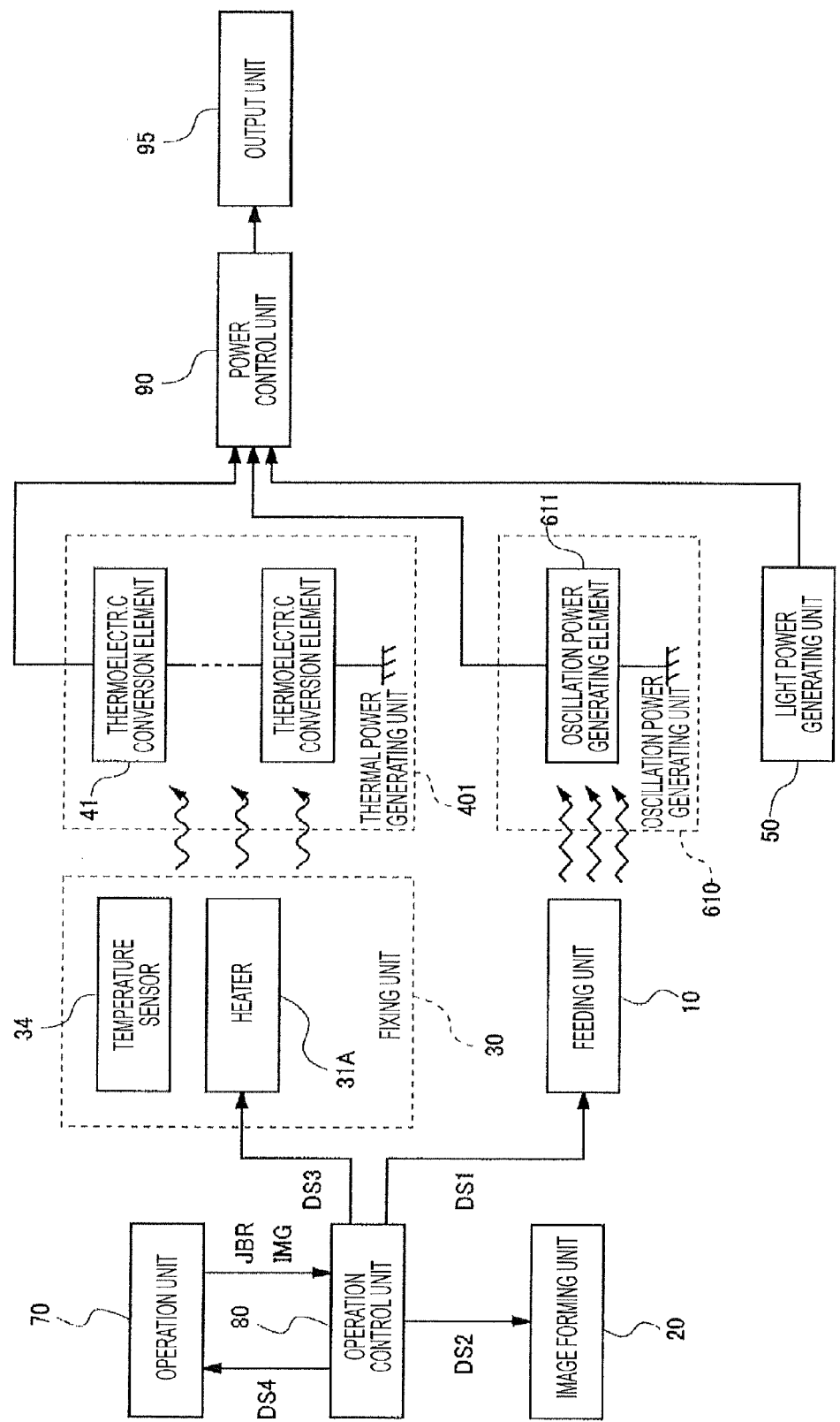
FIG. 6 is a function block diagram of the image forming apparatus illustrated in FIG. 1.

FIG. 6 is a function block diagram of the image forming apparatus 100. Referring to FIG. 6, the operation control unit 80 initially allows the operation unit 70 to receive a job request JBR or image data IMG from the user or a network under the firmware. Then, the operation control unit 80 controls operations of other function units of the image forming apparatus 100, such as the feeding unit 10, the image forming unit 20, the fixing unit 30, the power control unit 90, and the output unit 95 based on the request JBR. More specifically, the operation control unit 80 transmits driving signals DS1-DS4 to the respective function units to give an instruction of a current operation mode to be selected. For example, the operation control unit 80 expresses the type of the operation mode to be included in the instruction by using an environment variable, and urges the respective function units to refer to the environment variable. By this method, the operation control unit 80 allows the respective function units to start processing in accordance with the operation mode corresponding to the instruction.

Figure 7:
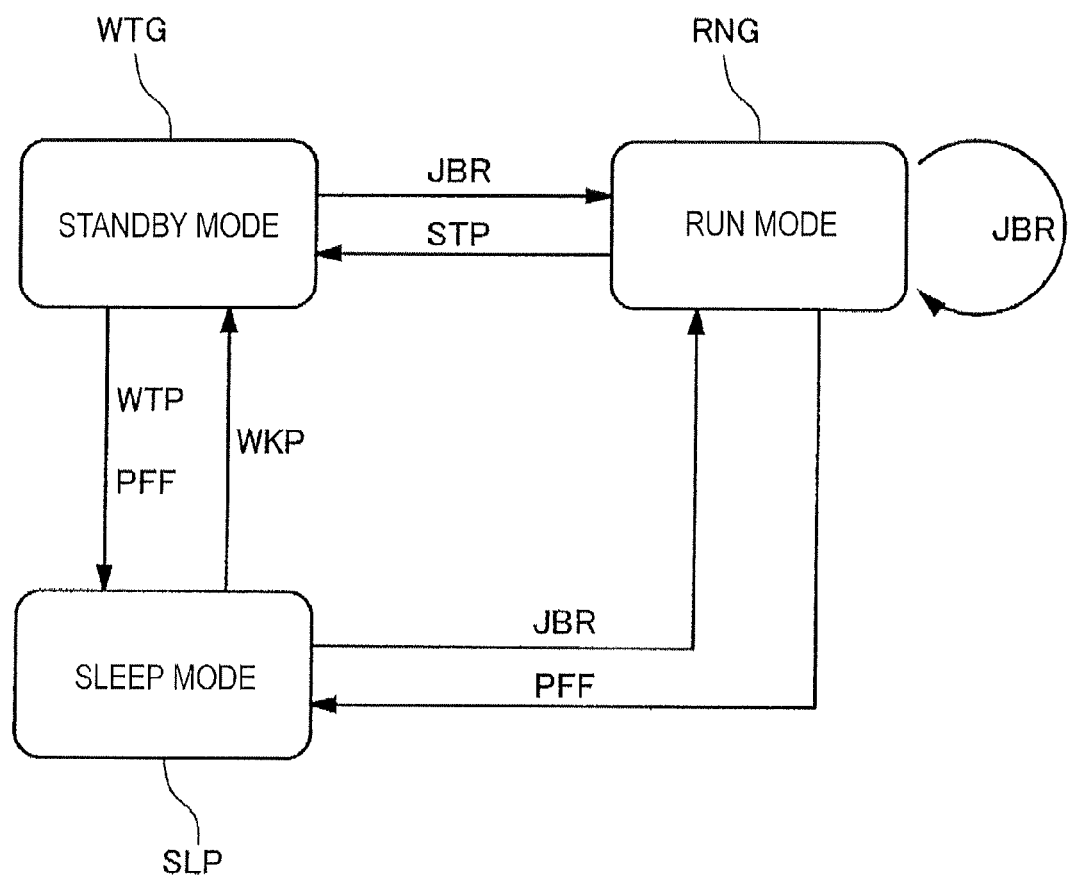
FIG. 7 is a figure illustrating state transitions of the image forming apparatus illustrated in FIG. 1.

FIG. 7 is a figure illustrating state transitions of the image forming apparatus 100. Referring to FIG. 7, the operation modes of the image forming apparatus 100 are roughly divided into three types of run mode RNG, standby mode WTG, and sleep mode SLP. The run mode RNG is also called a successive printing mode, and executes printing on a sheet. In this mode, the feeding unit 10 successively feeds a necessary number of sheets. The image forming unit 20 repeats formation of toner images and transfer of the toner images to sheets. The fixing unit 30 continues heating and pressurizing treatment for sheets. The standby mode WTG prepares and maintains a sheet printing allowable state. In this mode, both the feeding unit 10 and the image forming unit 20 stop operation, and the fixing unit 30 reheats the fixing roller 31 and retains an appropriate temperature of the fixing roller 31. The sleep mode SLP reduces the power consumption to the necessity minimum. In this mode, the fixing unit 30 stops operation as well as the feeding unit 10 and the image forming unit 20. Particularly, power supply to a built-in heater 31A is cut off.

The operation control unit 80 updates values of environment variables indicating the current operation mode in accordance with events caused in the image forming apparatus 100. Based on this update, the respective operation modes RNG, WTG, and SLP shift to other modes. For example, the run mode RNG shifts to the standby mode WTG in accordance with a stop event STP, and shifts to the sleep mode SLP in accordance with a power off event PFF. The stop event STP includes completion of printing, press of a stop button, and reception of a stop command from the network. The power off event PFF includes press of a power off button. The run mode RNG is continued when a new printing request JBR is issued. The standby mode WTG shifts to the run mode RNG in accordance with the printing request JBR, and shifts to the sleep mode SLP in accordance with expiration of a standby period WTP or the power off event PFF. The sleep mode SLP shifts to the run mode RNG in accordance with the printing request JBR, and shifts to the standby mode WTG in accordance with a return event WKP. The return event WKP contains press of an arbitrary press button, touch of the touch panel, and reception of a return command from the network.

The operation control unit 80 further supplies information necessary for each of the operation modes to the respective function units. For example, the following procedures are executed when an instruction of the run mode RNG is given. For the feeding unit 10, the operation control unit 80 determines the type and the number of sheets to be successively fed, the timing for starting rotation of the timing roller 14, and other conditions, and transmits the driving signal DS1 showing the determined conditions. For the image forming unit 20, the operation control unit 80 determines information on toner images to be formed on the photosensitive drums 25 of the respective image forming units 21Y to 21K, and the timing for the formation based on the image data IMG, and transmits the driving signal DS2 showing the determined information to the image forming unit 20. For the fixing unit 30, the operation control unit 80 initially requires measurements obtained by the temperature sensor 34, determines the temperature control amount for the fixing roller 31, i.e., the heat generating amount of the heater 31A based on the measurements, and transmits the driving signal DS3 showing the determined amount to the fixing unit 30.

[Power Control Unit]

Figure 8:
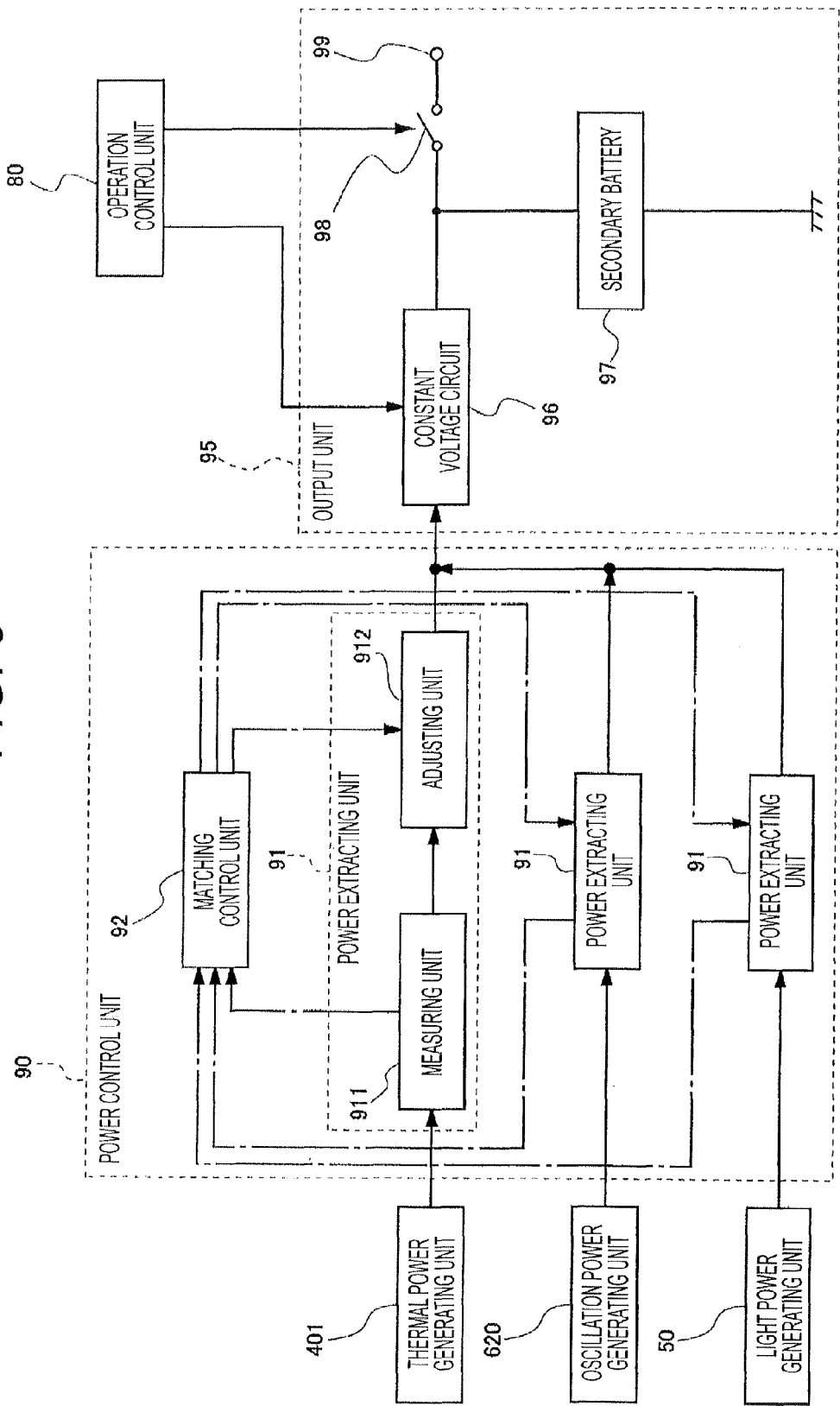
FIG. 8 is a function block diagram of a power control unit and an output unit illustrated in FIG. 6.

FIG. 8 is a function block diagram of the power control unit 90 and the output unit 95. Referring to FIG. 8, the power control unit 90 includes a power extracting unit 91 and a matching control unit 92. The power control unit 90 controls power output from the plural power generating units 401, 620, and 50 in parallel by using the function units 91 and 92. FIG. 8 does not show other power generating units 402 and 610.

The power extracting unit 91 is provided for each of the power generating units 401, 620, and 50, and individually controls the output of the connected power generating unit. More specifically, each of the power extracting units 91 contains a measuring unit 911 and an adjusting unit 912. The measuring unit 911 is connected with the corresponding one of the power generating units 401 to 50 to measure output voltage and output current of the connected power generating unit, and transmits the result to the matching control unit 92. The adjusting unit 912 contains a switching converter, for example. The adjusting unit 912 controls the output voltage or the output current of the power generating unit connected with the measuring unit 911 by using the switching converter to adjust the output voltage of the corresponding power generating unit to a predetermined value. Particularly, the adjusting unit 912 matches the predetermined value with a target value of output voltage received from the matching control unit 92.

The matching control unit 92 determines a target value of output voltage to be shared by all the control target power generating units 401 to 50 based on the values measured by the respective measuring units 911, and issues an instruction about the target value to the respective adjusting units 912.

More specifically, the matching control unit 92 initially receives measurements of output voltage and output current of the power generating units from the measuring units 911 connected therewith, and calculates power-voltage characteristics of the corresponding power generating units, particularly the maximum power points based on the received values. This calculation may be performed by using known methods. For example, when "hill-climbing method" is used for the calculation, the matching control unit 92 allows the respective adjusting units 912 to gradually change output voltages of the power generating units, and allows the respective measuring units 911 to repeat measurements of output voltages and output currents of the power generating units for every change of the output voltages. The matching control unit 92 further calculates increase and decrease of output power of the respective power generating units based on the measurements, determines variations of output voltages of the power generating units such that the power can increase, and issues an instruction about the variations to the adjusting units 912 connected with the corresponding power generating units. The matching control unit 92 repeats the foregoing operations until the output voltages of the respective power generating units do not further increase so as to determine the maximum power points of the power generating units based on the results of the operations.

After calculation of power-voltage characteristics of all the power generating units, the matching control unit 92 determines a target value of output voltage based on the calculated characteristics. Particularly, the matching control unit 92 selects calculation for determining the target value in accordance with distribution of the maximum power points indicated by the characteristics in the following manners. (1) When the distribution lies within a first range (hereinafter referred to as "simple setting range"), the matching control unit 92 calculates a representative value of the distribution (more specifically, average value, intermediate value, or mode value), and determines the representative value as a target value. (2) When the distribution exceeds the simple setting range and expands into a second range (hereinafter referred to as "detailed setting range"), the matching control unit 92 adds the power-voltage characteristics of all the power generating units to calculate the power-voltage characteristics of the whole power generating units, and determines a voltage value at the maximum power point indicated by the characteristics of the whole power generating units as a target value. The processing for determining the target value by the matching control unit 92 will be detailed later.

When a power generating unit whose maximum power point lies out of the detailed setting range is present, the matching control unit 92 excludes the power-voltage characteristics of the corresponding power generating unit from the target of the calculation (1) or (2). The matching control unit 92 further excludes the corresponding power generating unit from the target of power control. More specifically, the matching control unit 92 allows the power extracting unit 91 connected with the corresponding power generating unit to cut off output from the corresponding power generating unit.

[Output Unit]

Referring to FIG. 8, the output unit 95 includes a constant voltage circuit 96, a secondary battery 97, a switch 98, and an output port 99. The output unit 95 accumulates power output from the respective power generating units 401 to 602, or outputs the power to the operation unit 70, the operation control unit 80, the power control unit 90 and other function units by using the function units 96 to 99.

The constant voltage circuit 96 connects the power control unit 90 and the secondary battery 97, and supplies current output from the power control unit 90 to the secondary battery 97. In this case, the constant voltage circuit 96 controls voltage applied to the secondary battery 97 in such a level as to maintain the target value indicated by the instruction from the operation control unit 80.

The secondary battery 97 is a lithium ion battery, for example, and is connected between the constant voltage circuit 96 and a ground conductor. The operation control unit 80 changes the target value to be presented to the constant voltage circuit 96 in an instruction in accordance with the charging system of the secondary battery 97. The charging system is determined based on the type of the secondary battery 97. When the secondary battery 97 is a lithium ion battery, for example, the operation control unit 80 charges the secondary battery 97 by constant current constant voltage system (CCCV system).

The switch 98 connects a connection point between the constant voltage circuit 96 and the secondary battery 97 with the output port 99, or disconnect the connection point from the output port 99 in accordance with an instruction from the operation control unit 80. For example, the operation control unit 80 allows the switch 98 to connect the constant voltage circuit 96 and the secondary battery 97 with the output port 99 in the sleep mode or at power failure. In this case, the power generated from the power generating units 401 to 602, and the power accumulated in the secondary battery 97 are sent to the operation unit 70, the operation control unit 80, or the power control unit 90 via the output port 99, and utilized as standby power or auxiliary power.

[Determination of Target Value of Output Voltage]

—When Distribution of Maximum Power Points of Power Generating Units Lies within Simple Setting Range—

Figure 9:
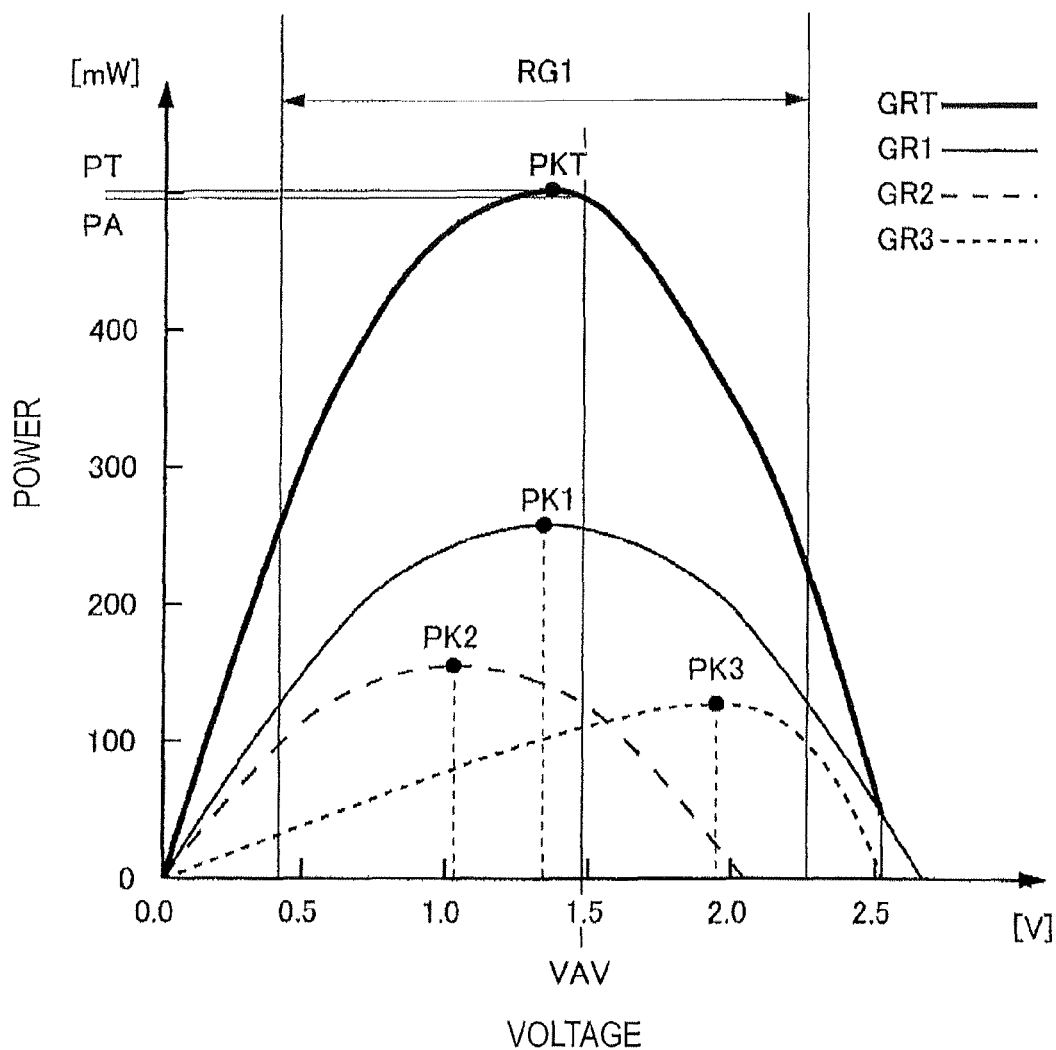
FIG. 9 is a graph showing a power-voltage characteristic curve of whole power generating units when maximum power points of all the power generating units lie within a simple setting range.

FIG. 9 is a graph showing power-voltage characteristic curves of each of the three power generating units 401, 402, and 610, and of the whole units 401, 402, and 610. Referring to FIG. 9, a graph GR1 represented by a fine solid line shows the power-voltage characteristic curve of the first thermal power generating unit 401. A graph GR2 represented by a rough broken line shows the curve of the second thermal power generating unit 402. A graph GR3 represented by a fine broken line shows the curve of the first oscillation power generating unit 610. A graph GRT represented by a bold solid line shows the sum of all these characteristic curves. It is assumed herein that only the three power generating units 401, 402, and 610 are mounted on the image forming apparatus 100 for convenience of explanation.

FIG. 9 shows a simple setting range RG1. The simple setting range RG1 is a section statically set beforehand within a range to be covered by the output voltages of all the power generating units 401, 402, and 610 in common. The width of the simple setting range RG1 is so determined as to meet the following conditions: "assuming that output voltages of all the power generating units at the maximum power points lie within the simple setting range, the sum of the output power of the whole power generating units becomes a value sufficiently close to the value at the maximum power point of the whole power generating units, that is, the difference between the value of the sum and the value at the maximum power point is within a tolerance, when the output voltages of all the power generating units are equalized with a representative value (average value or the like) of the output voltages at the maximum power points".

For example, the simple setting range is so determined as to meet the following conditions when the maximum power points of all the power generating units lie within the simple setting range. (A) The width of the simple setting range is equivalent to a value representing the full widths at half maximums of the power-voltage characteristic curves of the power generating units. (B) The sum of the halves of the output voltages of the whole power generating units at the maximum power points does not become substantially lower, i.e., in excess of the tolerance, than the output power at the power generating unit of any of the power generating units. Under the condition (A), output power of a power generating unit at any output voltage lying in the simple setting range does not become substantially lower than the half of the output power at the maximum power point of the corresponding power generating unit as long as the maximum power point of the corresponding power generating unit lies within the simple setting range. Under the condition (B), the sum of the output power of the whole power generating units at any equalized voltage of all the power generating units within the simple setting range does not become substantially lower than the output power at the maximum power point of any of the power generating units. Accordingly, when the output voltages of all the power generating units are equalized with a representative value of output voltages at the maximum power points, it is expected that the output power of the whole power generating units becomes sufficiently close to the value at the maxim power point of the whole power generating units. At least, the output power of the whole power generating units does not become lower than power extracted only from the power generating unit outputting the maximum power in the power generating units.

According to the example illustrated in FIG. 9, all of voltages at a maximum power point PK1 of the first thermal power generating unit 401, a maximum power point PK2 of the second thermal power generating unit 402, and a maximum power point PK3 of the first oscillation power generating unit 610 lie within the simple setting range RG1. In this case, the matching control unit 92 calculates a representative value VAV of the voltages at these maximum power points, and determines the representative value VAV as a target value of output voltage. As can be read from the power-voltage characteristic curve GRT of the whole power generating units, a sum. PA of the output power of the whole power generating units becomes sufficiently close to a value PT at the maximum power point PKT of the whole power generating units when the output voltages of all the power generating units 401 to 610 are equalized with the representative value VAV. Accordingly, the power PA sufficiently close to the maximum power PT allowed to be extracted from the whole power generating units can be extracted from the whole power generating units only by equalizing the output voltages of all the power generating units 401 to 610 with the representative value VAV of the output voltages at the maximum power points of the respective power generating units.

By this method, the matching control unit 92 determines the representative value of the output voltages at the respective maximum power points as a target value of output voltage when the maximum power points of all the power generating units lie within the simple setting range. As a result, power allowed to be extracted from the whole power generating units increases.

—When Distribution of Maximum Power Points Enters Detailed Setting Range—

Figure 10:
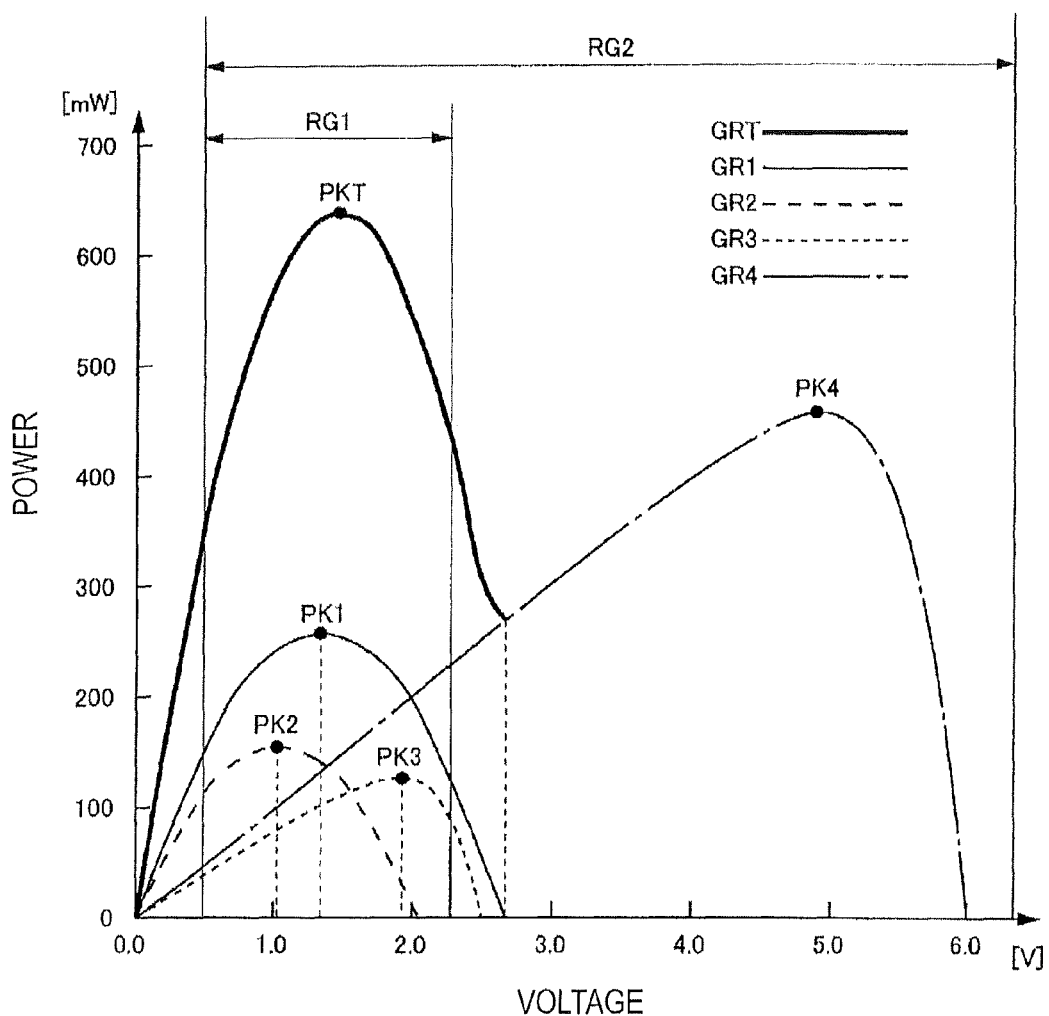
FIG. 10 is a graph showing a power-voltage characteristic curve of whole power generating units when a maximum power point of a part of the power generating units exceeds the simple setting range and lies within a detailed setting range.

FIG. 10 is a graph showing power-voltage characteristic curves of each of the four power generating units 401, 402, 50, and 610, and of the whole units 401, 402, 50, and 610. Referring to FIG. 10, a graph GR1 represented by a fine solid line shows the power-voltage characteristic curve of the first thermal power generating unit 401. A graph GR2 represented by a rough broken line shows the curve of the second thermal power generating unit 402. A graph GR3 represented by a fine broken line shows the curve of the first oscillation power generating unit 610. A graph GR4 represented by a dashed line shows the curve of the light power generating unit 50. A graph GRT represented by a bold solid line shows the sum of all these characteristic curves. It is assumed herein that only the four power generating units 401 to 610 are mounted on the image forming apparatus 100 for convenience of explanation.

FIG. 10 shows a detailed setting range RG2 in addition to the simple setting range RG1. The detailed setting range RG2 is a section statically set beforehand within a range covered by all the power generating units 401 to 610 in common. The lower limit of the detailed setting range RG2 is equivalent to the lower limit of the simple setting range RG1, while the upper limit of the detailed setting range RG2 is substantially equivalent to the upper limit of output voltage allowed to be set for all the power generating units.

According to the example shown in FIG. 10, the voltages at the maximum power point PK1 of the first thermal power generating unit 401, the maximum power point PK2 of the second thermal power generating unit 402, and the maximum power point PK3 of the first oscillation power generating unit 610 lie within the simple setting range RG1, while the voltage at the maximum power point PK4 of the light power generating unit 50 exceeds the upper limit of the simple setting range RG1, and enters the detailed setting range RG2. In this case, the matching control unit 92 initially adds the power-voltage characteristic curves GR1 to GR4 of all the four power generating units 401 to 610 to obtain the power-voltage characteristic curve GRT of the whole power generating units. Referring to FIG. 10, the characteristic curve GRT becomes a curve represented by a bold solid line in the area where the individual characteristic curves GR1 to GR4 of the respective power generating units overlap with each other, but in the other area the curve GRT becomes such a curve which agrees with the characteristic curve GR4 of the light power generating unit 50. Then, the matching control unit 92 designates a maximum power point PKT based on the shape of the characteristic curve GRT of the whole power generating units. According to the example shown in FIG. 10, the characteristic curve GRT has peaks at the point PKT within the area where the individual characteristic curves GR1 to GR4 of the respective power generating units overlap with each other, and at a maximum power point PK4 of the light power generating unit 50. The matching control unit 92 compares the levels of power between the peaks PKT and PK4, and designates the peak PKT indicating the maximum power as the maxim power point of the whole power generating units.

Accordingly, when the maximum power point of a part of the power generating units exceeds the simple setting range and enters the detailed setting range, the matching control unit 92 designates the voltage at the maximum power point PKT of the whole power generating units based on the actual shape of the characteristic curve GRT of the whole power generating units, and determines the designated voltage as a target value of output voltage. As a result, power allowed to be extracted from the whole power generating units increases.

As illustrated in FIG. 9, the matching control unit 92 determines a representative value of output voltages at the respective maximum power points as a target value when distribution of the maximum power points of the power generating units lies within the simple setting range. On the other hand, as illustrated in FIG. 10, the matching control unit 92 adds the power-voltage characteristic curves of the respective power generating units, and calculates the detailed shape of the power-voltage characteristic curve of the whole power generating units only when the distribution exceeds the simple setting range and enters the detailed setting range. Calculation for obtaining a representative value of output voltage from the distribution of the maximum power points of the power generating units requires a smaller amount of calculation than the amount of calculation for obtaining the detailed shape of the whole power generating units from the characteristic curves of the respective power generating units. Accordingly, the matching control unit 92 can reduce both the burden and time required for determining the target value.

—When Distribution of Maximum Power Points Lies Out of Detailed Setting Range—

Figure 11:
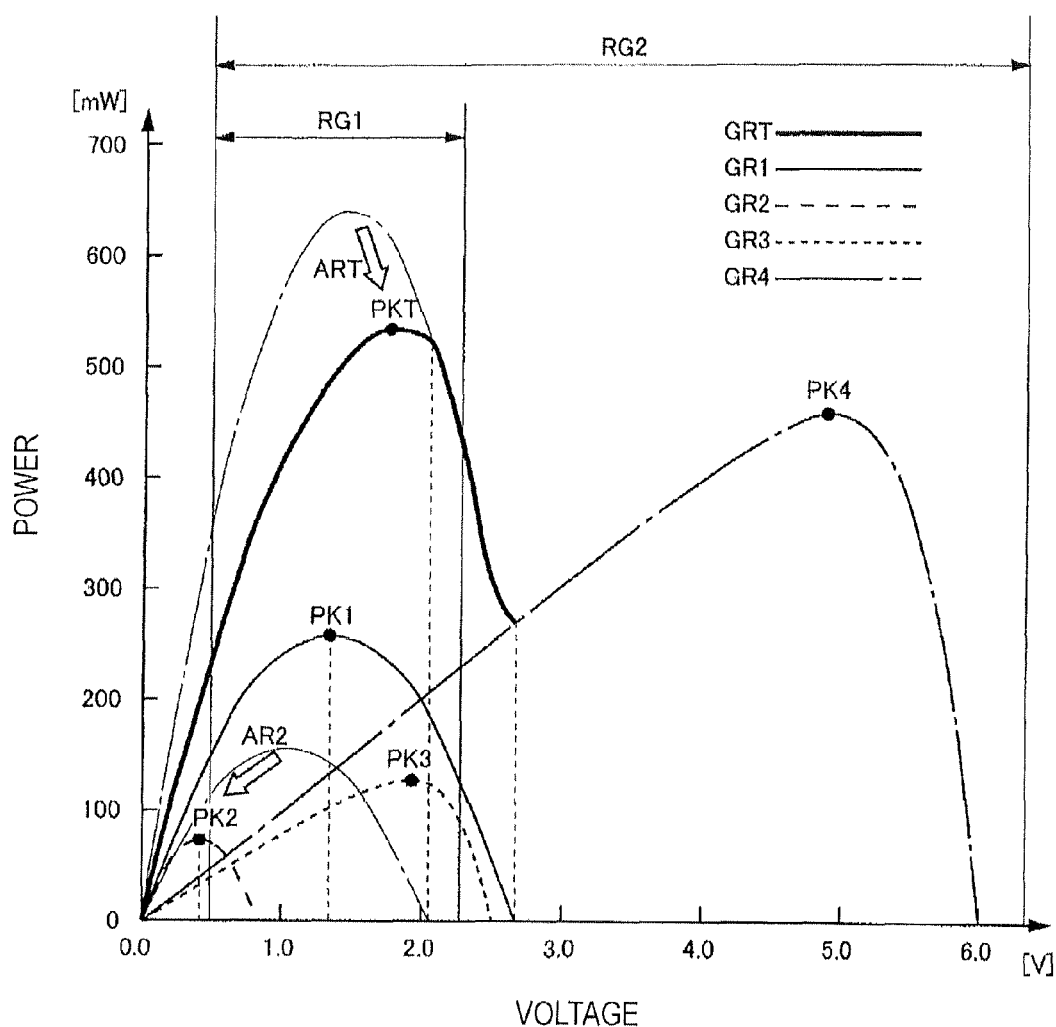
FIG. 11 is a graph showing a change of the power-voltage characteristic curve of the whole power generating units when the maximum power point corresponding to one of the power generating units and included in the maximum power points illustrated in FIG. 10 lies out of the detailed setting range.

FIG. 11 is a graph showing power-voltage characteristic curves of each of the four power generating units 401, 402, 50, and 610, and of the whole units 401, 402, 50, and 610. The graph shown in FIG. 11 is different from the graph shown in FIG. 10 in that a peak PK2 of a graph GR2 represented by a rough broken line lies out of the detailed setting range RG2. This condition occurs when the maximum power point PK2 of the second thermal power generating unit 402 shifts in the direction indicated by an arrow AR2 in FIG. 11, along with shift of the output voltage at the maximum power point PK2 to a value lower than the lower limit of the detailed setting range RG2, in accordance with fluctuations of the environmental temperature such as a temperature drop of the sheet SH3 on the discharge tray 38. This shift of the maximum power point PK2 deforms the power-voltage characteristic curve GRT of the whole power generating units in the direction indicated by an arrow ART illustrated in FIG. 11.

Referring to FIG. 11, the output power at the maximum power point PK2 of the second thermal power generating unit 402 is considerably lower than the values at the maximum power points PK1 and PK3 of the other power generating units 401 and 610. For example, when the width of the simple setting range RG1 is determined based on the full width at half maximum of the power-voltage characteristic curve of the power generating unit having the maximum power point lying within the simple setting range, output power at the maximum power point lying at a point lower than the lower limit of the detailed setting range RG2 is generally lower than the half of the value at the maximum power point lying within the simple setting range RG1. Accordingly, the proportion of the power generated from the second thermal power generating unit 402, i.e., the power generating unit whose maximum power point is lower than the lower limit of the detailed setting range RG2 is generally an extremely small proportion allowed to be ignored. According to the example shown in FIG. 11, the power-voltage characteristic curve GRT of the whole power generating units has a substantially similar shape in either cases when the power-voltage characteristic curve GR2 of the second thermal power generating unit 402 is added to the power-voltage characteristic curve GRT or when not added thereto. Accordingly, the position of the maximum power point PKT does not particularly change.

When the maximum power point of a part of the power generating units lies out of the detailed setting range like the maximum power point PK2 of the second thermal power generating unit 402 illustrated in FIG. 11, the matching control unit 92 excludes the power-voltage characteristic curve of the corresponding power generating unit from the calculation targets for determining the target value of the output voltage. Accordingly, the matching control unit 92 can reduce both the burden and time required for determining the target value without deteriorating the accuracy of the target value.

[Flow of Processing Executed by Power Control Unit]

FIG. 12 is a flowchart of power control executed by the power control unit 90 for the power generating units 401 to 602. This control is started every time the measuring units 911 within the power extracting units 91 connected with the respective power generating units 401 to 602 measure output voltages and output currents of the connected power generating units.

In step S1201, the matching control unit 92 calculates maximum power points of the respective power generating units. More specifically, the matching control unit 92 initially receives measurements of output voltages and output currents of the connected power generating units 401 to 602 from the measuring units 911 connected with the corresponding power generating units. Then, the matching control unit 92 calculates the power-voltage characteristics of the respective power generating units from the received measurements, and determines the respective maximum power points by using hill-climbing method, for example. Then, the process proceeds to step S1202.

In step S1202, the matching control unit 92 determines whether or not the distribution of the maximum power points, which are calculated in step S1201 and correspond to the calculation targets, lies within the simple setting range. When the distribution lies within the simple setting range, the process proceeds to step S1203. When the distribution exceeds the simple setting range, the process proceeds to step S1204.

In step S1203, the distribution of the maximum power points lies within the simple setting range. Accordingly, the matching control unit 92 calculates a representative value of the distribution, more specifically, an average value, an intermediate value, or a mode value, and determines the representative value as a target value of output voltage to be shared by all the power generating units 401 to 602. Then, the process proceeds to step S1208.

In step S1204, the distribution of the maximum power points exceeds the simple setting range. The matching control unit 92 determines whether or not all the maximum power points exceeding the simple setting range lie within the detailed setting range. When all the maximum power points lie within the detailed setting range, the process proceeds to step S1205. When any of the maximum power points further exceeds the detailed setting range, the process proceeds to step S1207.

In step S1205, the distribution of the maxim power points exceeds the simple setting range but lies within the detail setting range. Accordingly, the matching control unit 92 adds all the power-voltage characteristic curves of the power generating units calculated in step S1201 and corresponding to calculation targets to obtain the power-voltage characteristic curve of the whole power generating units. Then, the process proceeds to step S1206.

In step S1206, the matching control unit 92 investigates the shape of the power-voltage characteristics of the whole power generating units, and designates the maximum power point of the whole power generating units to select the voltage at that point as a target value of output voltage. Then, the process proceeds to step S1208.

In step S1207, the power generating unit whose maximum power point lies out of the detailed setting range is present. Accordingly, the matching control unit 92 excludes the measurements representing the power-voltage characteristic curve of the corresponding power generating unit from the calculation targets. Then, the process repeats the same steps from step S1202 using only the measurements representing the power-voltage characteristic curves of the remaining power generating units.

In step S1208, the matching control unit 92 issues an instruction indicating the determined target value of output voltage to the adjusting units 912 connected with the respective power generating units. The adjusting units 912 control output voltages or output currents of the connected power generating units in accordance with the instruction to adjust the output voltages of the power generating units to the target value indicated in the instruction. Then, the processing ends.

The power control unit 90 allows the measuring units 911 to repeat measurement of outputs from the power generating units periodically, or for every detection of fluctuations of the environmental conditions affecting the operations of the power generating units, such as temperature fluctuations of the power generating units. By repeating the foregoing operations for every measurement, the power control unit 90 can extract a large amount of power from the whole power generating units in a stable condition regardless of fluctuations of the environmental conditions of the power generating units.

Advantages of the Present Invention

As can be understood from the following examples, the power control unit 90 according to the embodiment of the present invention contains a smaller number of constant voltage circuits in the output unit than the number of constant voltage circuits included in a system which individually performs MPPT for each of power generating units. Moreover, the power control unit 90 according to the embodiment extracts a larger amount of power than the amount of power extracted only from a power generating unit included in plural power generating units and having the highest voltage at the maximum power point, or generating the largest amount of power at the maximum point.

Figure 13A:
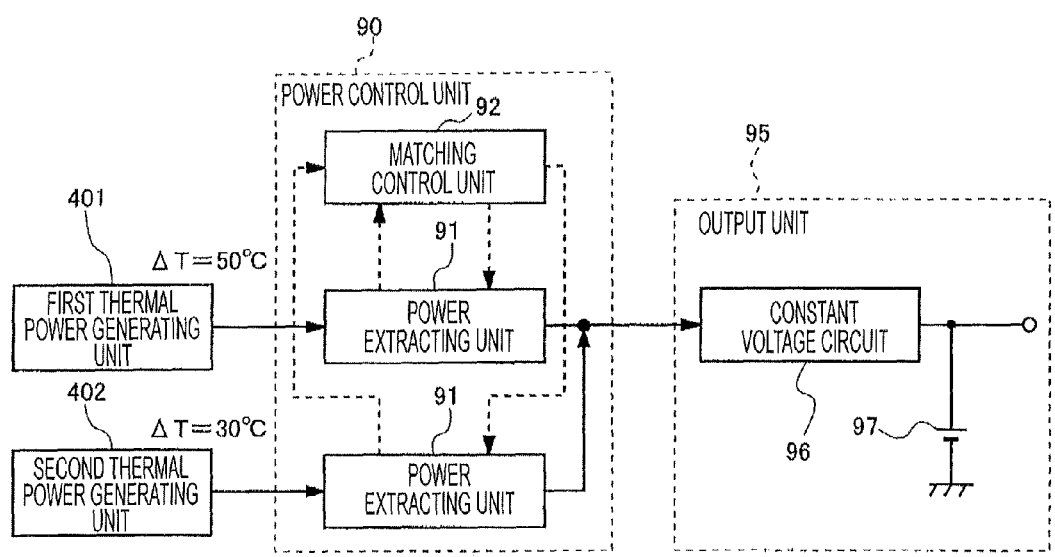
FIG. 13A is a block diagram showing the power control unit and the output unit of type (I) according to the embodiment of the present invention.
Figure 13B:
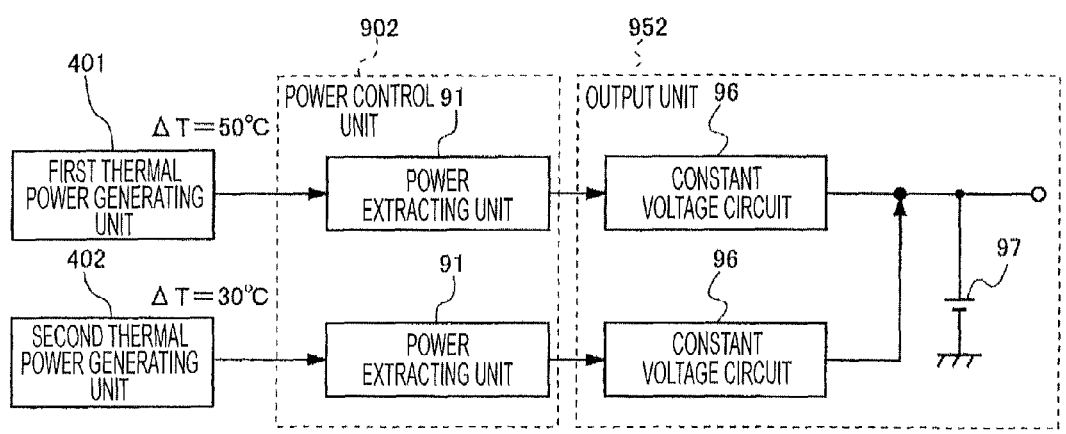
FIG. 13B is a block diagram showing a power control unit and an output unit of type (II) where different constant voltage circuits are connected to respective power generating units.
Figure 13C:
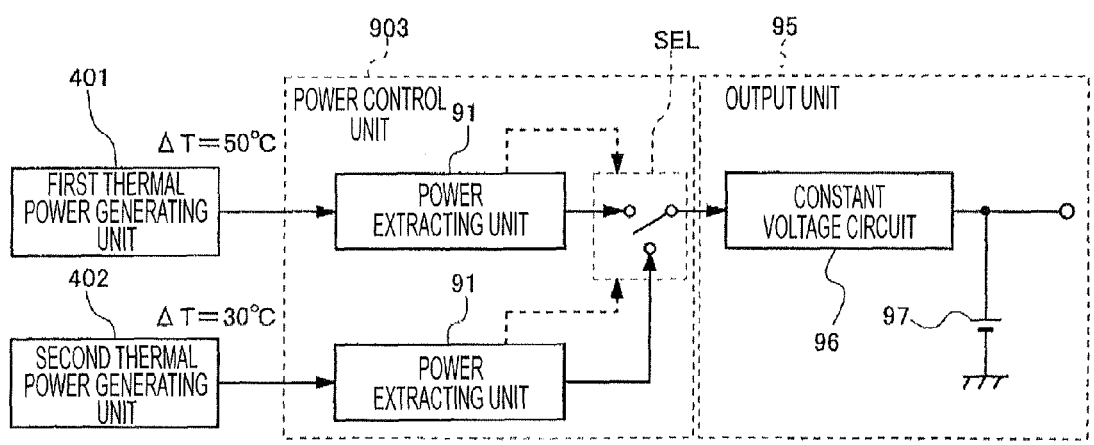
FIG. 13C is a block diagram showing a power control unit and an output unit of type (III) where any one of power generating units is selectively connected to the output unit.

FIG. 13A is a block diagram of the power control unit 90 and the output unit 95 according to the embodiment of the present invention. FIG. 13B is a block diagram of a power control unit and an output unit where different constant voltage circuits are connected to respective power generating units. FIG. 13C is a block diagram of a power control unit and an output unit where any of power generating units is selectively connected with the output unit. The power control unit and the output unit shown in each of FIGS. 13A, 13B, and 13C are hereinafter classified as type (I), (II), and (III), respectively. Referring to FIGS. 13A to 13C, each of the types (I) to (III) charges the secondary battery 97 by using power generated from the two thermal power generating units 401 and 402. It is assumed hereinbelow that only the thermal power generating units 401 and 402 are mounted on the image forming apparatus 100 for convenience of explanation.

Referring to FIG. 13A, similarly to the power control unit explained above, the power control unit 90 of type (I) performs power control for the thermal power generating units 401 and 402 in the following manner. Initially, the power control unit 90 allows the respective power extracting units 91 to measure output voltages and output currents of the connected thermal power generating units 401 and 402. Then, the power control unit 90 allows the matching control unit 92 to calculate power-voltage characteristic curves of the thermal power generating units 401 and 402. Thereafter, the power control unit 90 allows the matching control unit 92 to designate voltage in accordance with distribution of voltages at the maximum power points indicated by the calculated characteristic curves. The voltage to be designated corresponds to a representative value in the distribution, or voltage at the maximum power point obtained from the sum of the power-voltage characteristic curves of the whole power generating units. Then, the power control unit 90 allows the matching control unit 92 to determine the designated value as a target value of output voltage to be shared by both the thermal power generating units 401 and 402. Subsequently, the power control unit 90 allows the respective power extracting units 91 to control output voltages or output currents of the connected power generating units 401 and 402 to adjust the output voltages of the power generating units to the target value. Then, the power control unit 90 allows the single constant voltage circuit 96 to convert the voltage corresponding to the target value into charge voltage of the secondary battery 97.

Referring to FIG. 13B, type (II) is different from type (I) in that the constant voltage circuits 96 as many as the thermal power generating units 401 and 402 are included in an output unit 952. A power control unit 902 and the output unit 952 of type (II) perform power control for the thermal power generating units 401 and 402 in the following manner. Initially, the power control unit 902 allows the respective power extracting units 91 to individually perform MPPT control for the connected thermal power generating units 401 and 402 to adjust output voltages of the respective power generating units to values at the respective maximum power points. Then, the output unit 952 allows the constant voltage circuits 96, which are different from each other and individually connected to the respective power extracting units 91, to convert the respective output voltages of the connected power generating units into charge voltage of the secondary battery 97.

Referring to FIG. 13C, type (III) is different from type (I) in that a selecting unit SEL selects either the thermal power generating unit 401 or 402 and connects the selected one to the common constant voltage circuit 96. A power control unit 903 of type (III) performs power control for the thermal power generating units 401 and 402 in the following manner. Initially, the power control unit 903 allows the respective power extracting units 91 to individually perform MPPT control for the connected thermal power generating units 401 and 402 to adjust output voltages of the respective thermal power generating units to values at the maximum power points. Then, the power control unit 903 allows the selecting unit SEL to compare respective amounts of power output from the thermal power generating units 401 and 402, and connect the thermal power generating unit outputting a larger amount of power to the single constant voltage circuit 96. Thereafter, the power control unit 903 allows the constant voltage circuit 96 to convert the output voltage of the connected power generating unit into charge voltage of the secondary battery 97.

Figures 14A, 14B, 14C:
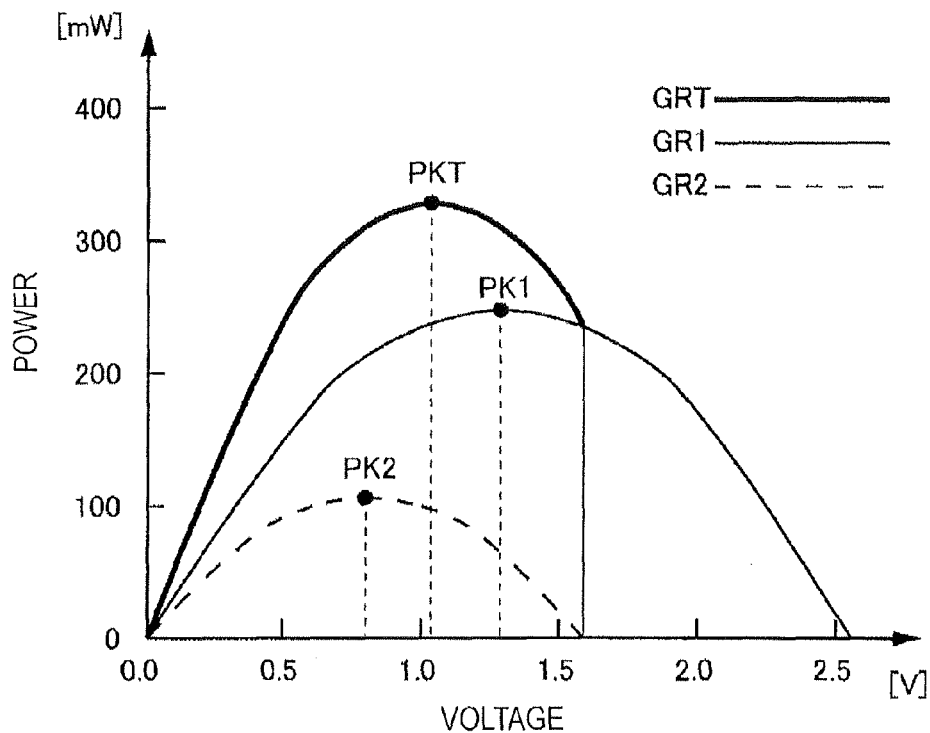
FIG. 14A is a graph showing power-voltage characteristic curves of each of two thermal power generating units illustrated in FIGS. 13A to 13C, and of the whole power generating units.
FIG. 14B is a table showing voltage values and amounts of power at respective maximum power points shown in FIG. 14A.
FIG. 14C is a table showing amounts of power extracted by the respective types illustrated in FIGS. 13A to 13C from the thermal power generating units indicating the power-voltage characteristics shown in FIGS. 14A and 14B, and percentages of extraction by the respective types.

It is assumed herein, for example, that the temperature differences detected by the thermal power generating units 401 and 402 illustrated in FIGS. 13A to 13C are 50° C. and 30° C., respectively. FIG. 14A is a graph showing power-voltage characteristic curves of each of the thermal power generating units 401 and 402, and of the whole power generating units. Referring to FIG. 14A, a graph GR1 represented by a fine solid line shows the power-voltage characteristic curve of the first thermal power generating unit 401. A graph GR2 represented by a rough broken line shows the curve of the second thermal power generating unit 402. A graph GRT of a bold solid line shows the curve of the sum of both the characteristic curves GR1 and GR2. FIG. 14B is a table showing voltage values and amounts of power at maximum power points PK1, PK2, and PKT of the respective characteristic curves GR1, GR2, and GRT shown in FIG. 14A.

FIG. 14C is a table showing amounts of power extracted by each of types (I), (II), and (III) from the thermal power generating units 401 and 402 having the power-voltage characteristics shown in FIGS. 14A and 14B, and percentages of the respective amounts of power. Type (I) adjusts output voltages of the respective thermal power generating units 401 and 402 to a value substantially equivalent to voltage at the maximum power point of the whole power generating units. Accordingly, the amount of power extracted by type (I) is equivalent to the value at the maximum power point of the whole power generating units, i.e., 315 [mW]. Type (II) adjusts the output voltages of the power generating units 401 and 402 to voltages at the respective maximum power points of the power generating units 401 and 402. Accordingly, the amount of power extracted by type (II) is equivalent to the sum of the values at the maximum points of the respective thermal power generating units, i.e., 245+90.0=335 [mW]. Type (III) extracts power at the maximum power point from the thermal power generating unit 401 or 402 generating a larger amount of power at the maximum power point. Accordingly, the amount of power extracted by type (III) is equivalent to the value of the second thermal power generating unit 402 at the maximum power point, i.e., 245 [mW].

The amount of power extracted by type (I) is smaller than the value of type (II), but can reach approximately 90% of that value. Considering only a slight difference between the amounts of power of type (I) and type (II), simplification of the output unit achieved by sharing of the single constant voltage circuit by all the power generating units is more advantageous. Moreover, the amount of power extracted by type (III) reaches only 70% of the value of type (II). Accordingly, type (I), i.e., the power control unit 90 according to the embodiment of the present invention, can extract a larger amount of power than the amount of power extracted by type (III).

As discussed above, the image forming apparatus 100 according to the embodiment of the present invention allows the power control unit 90 to adjust output voltages of all the power generating units 401 to 602 to the same target value. Accordingly, accumulation or output of output voltage of all the power generating units can be achieved only by the single constant voltage circuit 96 included in the output unit 95. The image forming apparatus 100 further determines the target value particularly as the voltage value at the maximum power point of the whole power generating units based on power-voltage characteristics of all the power generating units. As a result, the sum of the amount of power output from the whole power generating devices to the output unit becomes larger than the amount of power produced when the output voltage to the output unit is determined based on power-voltage characteristics of any one of the power generating devices. Accordingly, the image forming apparatus 100 increases the amount of power allowed to be extracted from the whole power generating units 401 to 602 without increasing the scale of the structures of the power control unit 90 and the output unit 95.

Modified Examples (A) The image forming apparatus 100 is a color laser printer. The image forming apparatus may be other types of devices as long as a toner image can be fixed on a sheet by heat, such as a monochrome laser printer, a facsimile machine, a copy machine, and a multifunction machine (MFP).

(B) Sheets handled by the feeding unit 10 are made of paper. However, the sheets may be made of resin, such as OHP films. The feeding unit 10 may contain plural storage trays, and store therein sheets in different sizes such as A3, A4, A5, and B4. The feeding unit 10 may further include a mechanism for duplex printing.

(C) The fixing unit 30 includes a halogen lamp as the heater 31A contained in the fixing roller 31. However, the heater 31A may be an induction heater. The fixing unit 30 may include a combination of a fixing belt in contact with sheets, and a device for heating the fixing belt, in place of the fixing roller 31.

(D) The positions of the power generating units are not limited to the positions shown in FIG. 1. The thermal power generating unit may be disposed in the vicinity of elements releasing a large amount of heat in the image forming apparatus 100, such as a power source device, a driving motor for respective roller belts, and a CPU contained in the operation control unit 80, as well as the positions of the thermal power generating units 401 and 402 illustrated in FIGS. 1 and 2A, i.e., in the vicinity of the fixing unit 30 and on the upper surface of the discharge tray 38. The light power generating unit may be disposed at a position easily receiving external light or illumination light, such as on the front surface, side surface, rear surface, and operation panel of the housing of the image forming apparatus 100, as well as the position of the light power generating unit 50 illustrated in FIG. 1, i.e., on the upper surface of the ADF. The oscillation power generating unit may be disposed at a portion easily receiving oscillation in the image forming apparatus 100, such as on the ADF, in the vicinity of the roller belt inside the image forming unit, on a door formed in the housing of the image forming apparatus 100, on the storage tray 11, and on a finisher, as well as the positions of the oscillation power generating units 601 and 602 illustrated in FIG. 1, i.e., in the vicinity of the roller belt inside the feeding unit 10.

(E) The characteristics of the power generating units illustrated in FIGS. 3A to 5C are presented only by way of example. Power generating units to be used may have other characteristics. More specifically, the structure of the thermoelectric conversion elements included in the thermal power generating units is not limited to the structure of the thermoelectric conversion elements 41 illustrated in FIG. 2B. Any factor of the sizes and shapes of the substrates 42 and 43, and the numbers, shapes, sizes, arrangements, and types of the semiconductor elements 44P and 44N may be different from those illustrated in the figure. In addition, all the plural thermoelectric conversion elements 41 are not required to be connected in series within the thermal power generating units as in the case of the thermal power generating units 401 and 402 illustrated in FIG. 2A. For example, only one thermoelectric conversion element may be provided in the thermal power generating unit, or series connection of thermoelectric elements may be divided into plural parts each of which is connected in parallel. Furthermore, each of the thermal power generating units may include a small-sized stirling power generator in place of the thermoelectric conversion elements. The oscillation power generating unit may be of a piezoelectric type or an electromagnetic induction type, as well as the electrostatic induction type oscillation power generating units 610 and 620 illustrated in FIG. 3A. The types of power generating units may be such types which achieve radio wave power generation and wind power generation as well as thermoelectric conversion power generation, photoelectric conversion power generation, and oscillation power generation as illustrated in FIGS. 3A to 5C.

(F) The operation control unit 80, the power control unit 90, and the output unit 95 are mounted on the single substrate. Alternatively, any of these function units may be separately mounted on a different substrate. Instead, these function units may be integrated into a single chip.

(G) The operation control unit 80 allows the operation unit 70 to receive image data IMG from the network. Alternatively, the image forming apparatus 100 may incorporate a scanner or camera so that the operation control unit 80 can obtain image data from the scanner or camera. The image forming apparatus 100 may further include a video input terminal such as a USB port or memory card slot so that the operation control unit 80 can obtain image data from an external electronic device via the USB port or memory card slot.

(H) The matching control unit 92 of the power control unit 90 calculates power-voltage characteristic curves, particularly maximum power points of the respective power generating units 401 to 602 by using hill-climbing method. Alternatively, the matching control unit may use "voltage following method" for calculating characteristic curves and maximum power points. More specifically, the matching control unit may store beforehand tables or numerical expressions representing characteristic curves of the respective power generating units illustrated in FIGS. 3A to 5C, and calculate voltage values or current values at maximum power points of the respective power generating units based on measurements of the respective measuring units 911 with reference to the tables and numerical expressions. For example, the matching control unit may regard 50% of open circuit voltages of the thermal power generating units 401 and 402 as voltages at the maximum power points based on the fact that the power-voltage characteristic curves of the thermal power generating units 401 and 402 are parabolas. In addition, the matching control unit may regard 80% of open circuit voltage of the light power generating unit 50 as voltage at the maximum power point based on a typical characteristic curve of a solar cell. Alternatively, the matching control unit may calculate a maximum power point of a power generating unit based on the amount of output current of the corresponding power generating unit measured by the measuring unit 911 when the output voltage of the corresponding power generating unit is maintained at a particular level, and on a table or numerical expression representing the characteristic curve of the corresponding power generating unit. Instead, the matching control unit may estimate a shape of a characteristic curve of a power generating unit based on measurements of the measuring unit 911 with reference to a table or numerical expression representing the characteristic curve of the corresponding power generating unit.

(I) The matching control unit 92 determines a value substantially equivalent to the voltage at the maximum power point of the whole power generating units as a target value of output voltage to be included in an instruction to the adjusting unit 912. However, the target value may be other values. For example, a target value may be selected from a range of voltage where it is allowed to obtain, based on the power-voltage characteristic curve of the whole power generating units, at least a desired percentage, such as 90%, of the amount of power at the maximum power point of the whole power generating units, or a load of the output unit.

(J) The simple setting range RG1 and the detailed setting range RG2 illustrated in FIGS. 9 and 10 are determined for voltages at the maximum power points of the power generating units. Alternatively, the simple setting range and the detailed setting range may be determined for output voltages where a particular amount of power or output current is obtainable, such as open circuit voltages of the power generating units. In addition, the width of the simple setting range may be set to a width of a range where an amount of power at least a certain percentage other than 50% of the amount of power at the maximum power point is obtainable, in place of the full width at half maximum of the power-voltage characteristic curve of each power generating unit. Furthermore, the matching control unit may always determine only either a representative value of voltages corresponding to the maximum power points of the power generating units and lying within the simple setting range, or a voltage value at the maximum power point of the whole power generating units whose maxim power points lie within the detailed setting range, as a target value of output voltage.

(K) The operation control unit 80 switches the operation mode of the image forming apparatus 100 between the three modes of the run mode RNG, the standby mode WTG, and the sleep mode SLP illustrated in FIG. 7. The matching control unit 92 may divide the types of power generating units from which power is extracted in accordance with these operation modes. In this case, the power extracting unit 91 connected with a power generating unit which obviously generates only insufficient power in each of the operation modes, if any, can be stopped for reduction of the power consumption.

FIG. 15 is a table showing whether or not the respective power generating units are to be connected with the output unit in each of the operation modes illustrated in FIG. 7. Referring to FIG. 15, circles indicate power generating units to be connected with the output unit, while cross marks indicate power generating units not to be connected with the output unit. As shown in the table in FIG. 15, the first thermal power generating units 401, the second thermal power generating unit 402, and the oscillation power generating units 610 and 620 other than the light power generating unit 50 are not to be connected with the output unit 95 in the sleep mode SLP, while all the power generating units are to be connected with the output unit 95 in the run mode RNG. On the other hand, the first thermal power generating unit 401 and the light power generating unit 50 are to be connected with the output unit 95 in the standby mode WTG.

The rule of the table in FIG. 15 is based on the operation probabilities of the power generating units in the respective operation modes. In the sleep mode SLP, all of the feeding unit 10, the image forming unit 20, and the fixing unit 30 are stopped in the sleep mode SLP, wherefore none of the first thermal power generating unit 401, the second thermal power generating unit 402, and the oscillation power generating units 610 and 620 can generate power. In the run mode RNG, all of the feeding unit 10, the image forming unit 20, and the fixing unit 30 are driving, wherefore all of the first thermal power generating unit 401, the second thermal power generating unit 402, and the oscillation power generating units 610 and 620 can generate power. In the standby mode WTG, the feeding unit 10 and the image forming unit 20 are stopped, while the fixing unit 30 preheats the fixing roller 31 to maintain an appropriate temperature of the fixing roller 31, wherefore the first thermal power generating unit 401 can generate power. In this case, however, the second thermal power generating unit 402 and the oscillation power generating units 610 and 620 do not generate power. Unlike the other power generating units, the light power generating unit 50 can generate power in all of the operation modes.

The matching control unit 92 periodically obtains from the operation control unit 80 values of environment variables indicating the type of the current operation mode, and determines whether the operation mode has been changed from the previous mode based on the environment variables. When it is determined that the operation mode has been changed, the matching control unit 92 designates a power generating unit which should be connected with the output unit 95 in the current operation mode after the change with reference to the table shown in FIG. 15, and connects only the designated power generating unit with the output unit 95. More specifically, in the sleep mode SLP, the matching control unit 92 disconnects all of the first thermal power generating unit 401, the second thermal power generating unit 402, the oscillation power generating units 610 and 620 from the output unit 95, and connects only the light power generating unit 50 with the output unit 95. In the run mode RNG, the matching control unit 92 connects all of the power generating units 401 to 620 with the output unit 95. In the standby mode WTG, the matching control unit 92 connects the first thermal power generating nit 401 and the light power generating unit 50 with the output unit 95, and disconnects the second thermal power generating unit 402 and the oscillation power generating units 610 and 620 from the output unit 95. This structure allows the matching control unit 92 to connect the output unit 95 with only the power generating units capable of performing sufficient operation in the respective modes.

When the image forming apparatus 100 has additional copy function or scanner function, the operation control unit 80 may switch the operation mode of the image forming apparatus 100 between the additional functions and the foregoing three types of modes. In this case, the table in FIG. 15 additionally includes items indicating whether or not the respective power generating units are to be connected with the output unit for each of operation modes of the added functions.

The matching control unit 92 may control connection between the respective power generating units and the output unit based on a table showing whether or not the respective power generating units are to be connected with the output unit for each of time zones, such as morning, afternoon, and night. For example, the matching control unit 92 may connect the light power generating unit with the output unit during the daytime when a large amount of external light is receivable, and disconnect the light power generating unit during the nighttime when the receivable amount of external light is small.

(L) The output unit 95 supplies power output from the respective power generating units 401 to 620 to the operation unit 70, the operation control unit 80, or the power control unit 90 as standby power or auxiliary power during power failure. Moreover, the output unit 95 may provide the power for reheating and temperature retention of the fixing roller 31 or for driving the exhaust fan in the standby mode. When the amount of the output power from the respective power generating units is sufficiently large, the output from the power control unit 90 may be directly supplied to loads without the use of the output unit 95. In this case, the power control unit 90 may set the amount of power to be extracted from the whole power generating units to a predetermined value necessary for the loads receiving the supply, in place of the value at the maximum power point of the whole power generating units.

(M) The secondary battery 97 may be a nickel-cadmium secondary battery, or a nickel-hydrogen secondary battery in place of the lithium ion battery. In this case, the operation control unit 80 charges these batteries by constant current system.

(N) The image forming apparatus 100 interconnects the thermal power generating units 401 and 402, the light power generating unit 50, and the oscillation power generating units 610 and 620 to use the respective power generating units for charging the common secondary battery 97. Even when the amount of power generated by each of the power generating units is insufficient, or even when operation is instable with fluctuations of the environmental conditions, the image forming apparatus 100 maintains supply of a sufficiently large amount of power based on interconnection of the respective power generating units regardless of fluctuations of the environmental conditions.

This type of system for interconnecting plural power generating units may be present in wide variety of systems such as electric devices other than image forming apparatuses, automobiles, and heating devices. The use of a power controller similar to the power control unit 90 provided to control outputs of plural power generating units included in these systems is effective for further improvement of the utilization efficiency of power generated by the respective power generating units.

Figure 16A:
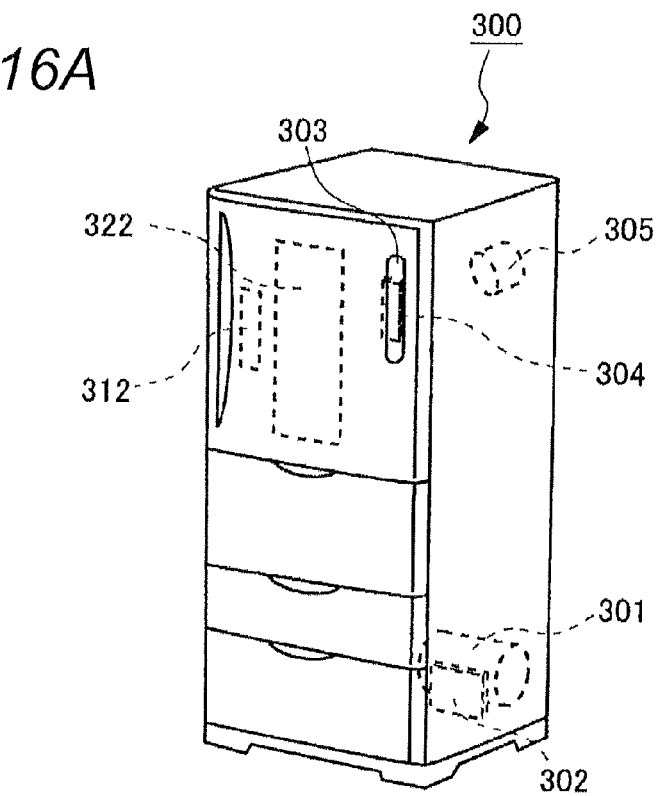
FIGS. 16A and 16B are perspective views illustrating a refrigerator and an automobile, respectively, which use plural power generating units for energy harvesting.

FIG. 16A is a perspective view illustrating a refrigerator including plural power generating devices for energy harvesting. Referring to FIG. 16A, a refrigerator 300 includes a compressor 301, a thermal power generating device 302, an oscillation power generating device 312, a light power generating device 322, an operation panel 303, a control device 304, and a blower 305. The compressor 301 compresses refrigerant to increase the pressure of the refrigerant. The thermal power generating device 302 disposed in the vicinity of the compressor 301 converts waste heat generated from the surface of the compressor 301 into power by using thermoelectric conversion elements contained in the thermal power generating device 302. The oscillation power generating device 312 embedded in a door of the refrigerator 300 converts oscillation produced by opening or closing the door into power by using oscillation power generating elements contained in the oscillation power generating device 312. The light power generating device 322 disposed on the front surface of the refrigerator 300 converts external light or illumination light applied to the front surface thereof into power by using a solar cell contained in the light power generating device 322. The operation panel 303 assembled into the front surface of the door of the refrigerator 300 interprets setting information given by operation of a user and transmits the setting information to the control device 304, and displays the setting information on a screen. The setting information contains refrigerator room setting temperatures such as a cold room and a freezer, quick freezing, and other settings of cooling conditions. The control device 304 disposed on the rear side of the operation panel 303 controls the compressor 301 in accordance with setting information received from the operation panel 303. The control device 304 contains a power controller and a secondary battery. The power controller receives power output from the respective power generating devices 302, 312, and 322, and accumulates the power in the secondary battery. The secondary battery supplies the accumulated power to loads such as the control device 304, the blower 305, and an indoor lamp. The blower 305 sends air cooled by the refrigerant to the cold room and the freezer.

Figure 16B:
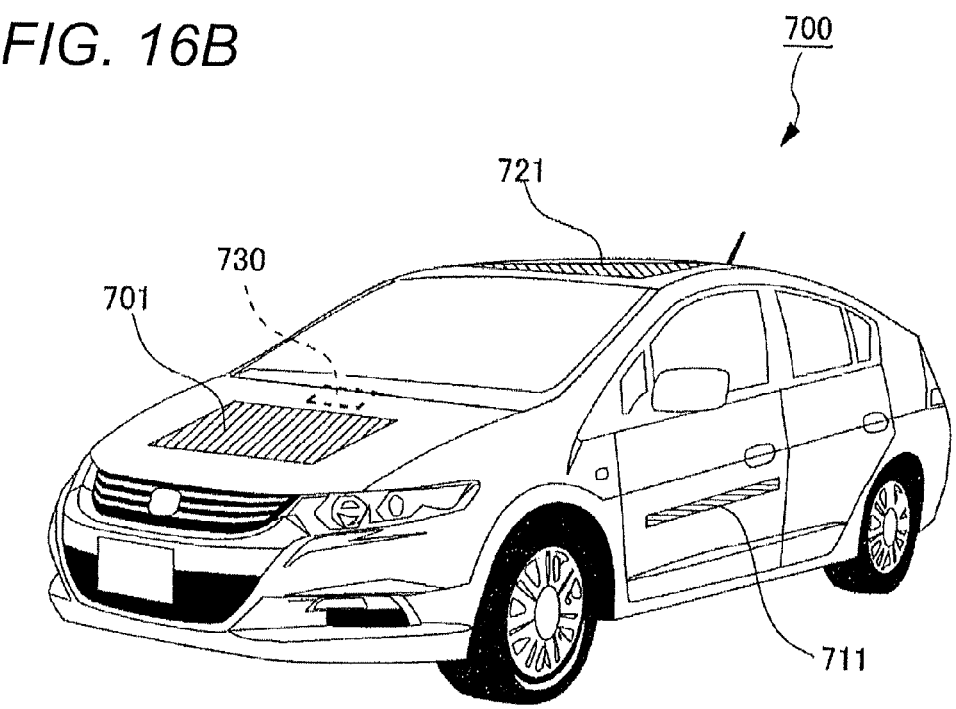

FIG. 16B is a perspective view illustrating an automobile including plural power generating devices for energy harvesting. Referring to FIG. 16B, an automobile 700 includes a thermal power generating device 701, an oscillation power generating device 711, a light power generating device 721, and an energy harvesting electronic control device (ECU) 730. The thermal power generating device 701 embedded in a bonnet converts waste heat generated from an engine into power by using thermoelectric conversion elements contained in the thermal power generating device 701. The oscillation power generating device 711 embedded in a door converts oscillation produced during running of the automobile 700 and opening or closing the door into power by using oscillation power generating elements contained in the oscillation power generating device 711. The light power generating device 721 disposed on the upper surface of a roof converts sunlight applied to the roof into power by using a solar cell contained in the light power generating device 721. The energy harvesting ECU 730 disposed in a car cabin contains a power controller and a secondary battery. The power controller receives power output from the respective power generating devices 701, 711, and 721 and accumulates the power in the secondary battery. The secondary battery supplies the power to other electronic devices mounted on the car, such as ECU.

In either of the systems illustrated in FIGS. 16A and 16B, the power controller designates the maximum power point of the whole power generating devices based on power-voltage characteristics of all the power generating devices 302, 312, and 322, or all the power generating devices 701, 711, and 721, and determines voltage at the maximum power point as a target value of output voltage common to all the power generating devices. In this case, output voltages of all the power generating devices are equalized with the target value, wherefore the power controller can convert the output voltage of the target value into voltage required for charging the secondary battery only by using a single constant voltage circuit. In addition, the target value corresponds to the value at the maximum power point of the whole power generating devices, wherefore the power controller can extract a large amount of power from the whole power generating devices.

Energy harvesting is also utilized for mobile devices such as watches and cellular phones, home electronics such as air conditioners and illuminations, transportation systems such as motor bicycles and vessels, digital signage, decorative illuminations, sensor networks in buildings and plants. When plural power generating devices are used in these systems, the power controller according to the invention is effective similarly to the case of the foregoing embodiment. Accordingly, the power controller can extract a large amount of power from whole plural power generating devices, and supply the extracted power to the systems without enlarging the scale of the structure.

The present invention relates to a control technology of power output from power generating devices. As discussed above, the control technology determines a target value of output voltage common to the respective power generating devices based on respective power-voltage characteristics of the plural power generating devices. Accordingly, it is obvious that the present invention is industrially applicable.

According to an embodiment of the invention, the power controller adjusts the output voltages of all the power generating units to the same target value, wherefore only a single constant voltage circuit is required to supply the output power of all the power generating devices to the load. Moreover, the power controller determines the target value based on the power-voltage characteristics of the whole parallel connection of the power generating devices. As a result, the sum of the amount of power output from the whole power generating devices to the load becomes larger than the amount of power produced when the output voltage to the load is determined based on power-voltage characteristics of any one of the power generating devices. Accordingly, the power controller increases the amount of power allowed to be extracted from the whole plural power generating devices without enlarging the scale of the structure.

According to an embodiment of the invention, the image forming apparatus allows the power control unit to adjust the output voltages of all the power generating units to the same target value, wherefore the output unit requires only a single constant voltage circuit to accumulate or output the output power of all the power generating devices. Moreover, the image forming apparatus determines the target value based on the power-voltage characteristics of the whole parallel connection of the power generating devices. As a result, the sum of the amount of power output from the whole power generating devices to the output unit becomes larger than the amount of power produced when the output voltage to the output unit is determined based on power-voltage characteristics of any one of the power generating devices. Accordingly, the image forming apparatus increases the amount of power allowed to be extracted from the whole plural power generating devices without enlarging the scale of the structure.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A power controller comprising:
a measuring unit that measures outputs from plural power generating devices outputting power to a common load in parallel;
an adjusting unit that controls the outputs of the plural power generating devices to adjust output voltages of the plural power generating devices to a predetermined value; and
a matching control unit that calculates power-voltage characteristics of the plural power generating devices based on values measured by the measuring unit, determines a target value of output voltage to be shared by all the plural power generating devices based on the power-voltage characteristics thus calculated and corresponding to the whole parallel connection of the plural power generating devices, and allows the adjusting unit to match the predetermined value with the target value.

2. The power controller according to claim 1, wherein the target value is equivalent to the value of the output voltage to be shared by all the plural power generating devices when the total amount of power output from the plural power generating devices to the load in parallel becomes the maximum.

3. The power controller according to claim 1, wherein the matching control unit selects calculation to be used in determining the target value in accordance with distribution of maximum power points of the plural power generating devices based on the calculated power-voltage characteristics.

4. The power controller according to claim 3, wherein the matching control unit selects calculation of a representative value in the distribution of the maximum power points as the calculation when the distribution lies within a first range, and determines the target value based on the representative value.

5. The power controller according to claim 4, wherein the matching control unit selects addition of the calculated power-voltage characteristics and executes practical calculation of power-voltage characteristics of the whole parallel connection of the plural power generating devices as the calculation when the distribution exceeds the first range and expands from the first range, and determines the target value based on a voltage value at the maximum power point indicated by the power-voltage characteristics of the whole parallel connection.

6. The power controller according to claim 5, wherein
the matching control unit excludes from the plural power generating devices a power generating device whose power-voltage characteristics indicate the maximum power point lying outside a second range when the distribution exceeds the second range wider than the first range and expands from the second range, and
the matching control unit selects calculation to be used in determining the target value in accordance with distribution of maximum power points of the remaining power generating devices.

7. The power controller according to claim 1, wherein the matching control unit adds the calculated power-voltage characteristics to make practical calculation of power-voltage characteristics of the whole parallel connection of the plural power generating devices, and determines the target value based on a voltage value at the maximum power point indicated by the power-voltage characteristics of the whole parallel connection.

8. The power controller according to claim 1, wherein the matching control unit selects from the plural power generating devices a power generating device whose output to the load is to be stopped in accordance with an operation mode of a system incorporating the plural power generating devices, and gives the adjusting unit an instruction indicating the selected power generating device.

9. The power controller according to claim 8, wherein
the system is an image forming apparatus, and
the plural power generating devices include a power generating device provided at a driving portion of the image forming apparatus where the driving state of the driving portion is variable in accordance with the operation mode of the image forming apparatus.

10. An image forming apparatus comprising:
a feeding unit that feeds plural sheets sheet by sheet;
an image forming unit that forms a toner image on a sheet fed by the feeding unit based on image data;
a fixing unit that fixes the toner image on the sheet by heat;
an operation control unit that supplies the image data to the image forming unit;
plural power generating units that include elements for converting heat, light, radio waves, or oscillation into power, and generate power by using waste heat generated from the fixing unit, light applied from the outside, radio waves transmitted through a space around the elements, or oscillation of the feeding unit;
a power control unit that controls power output from the plural power generating units in parallel; and
an output unit that accumulates or outputs the power, wherein
the power control unit includes
a measuring unit that measures outputs from plural power generating units outputting power to a common load in parallel,
an adjusting unit that controls the outputs of the plural power generating units to adjust output voltages of the plural power generating units to a predetermined value, and
a matching control unit that calculates power-voltage characteristics of the plural power generating units based on values measured by the measuring unit, determines a target value of output voltage to be shared by all the plural power generating units based on the power-voltage characteristics thus calculated and corresponding to the whole parallel connection of the plural power generating devices, and allows the adjusting unit to match the predetermined value with the target value.

11. The image forming apparatus according to claim 10, wherein the target value is equivalent to the value of the output voltage to be shared by all the plural power generating units when the total amount of power output from the plural power generating units to the load in parallel becomes the maximum.

12. The image forming apparatus according to claim 10, wherein the matching control unit selects calculation to be used in determining the target value in accordance with distribution of maximum power points of the plural power generating units based on the calculated power-voltage characteristics.

13. The image forming apparatus according to claim 12, wherein the matching control unit selects calculation of a representative value in the distribution of the maximum power points as the calculation when the distribution lies within a first range, and determines the target value based on the representative value.

14. The image forming apparatus according to claim 13, wherein the matching control unit selects addition of the calculated power-voltage characteristics and executes practical calculation of power-voltage characteristics of the whole parallel connection of the plural power generating units as the calculation when the distribution exceeds the first range and expands from the first range, and determines the target value based on a voltage value at the maximum power point indicated by the power-voltage characteristics of the whole parallel connection.

15. The image forming apparatus according to claim 14, wherein
the matching control unit excludes from the plural power generating units a power generating unit whose power-voltage characteristics indicate the maximum power point lying outside a second range when the distribution exceeds the second range wider than the first range and expands from the second range, and
the matching control unit selects calculation to be used in determining the target value in accordance with distribution of maximum power points of the remaining power generating units.

16. The image forming apparatus according to claim 10, wherein the matching control unit adds the calculated power-voltage characteristics to make practical calculation of power-voltage characteristics of the whole parallel connection of the plural power generating units, and determines the target value based on a voltage value at the maximum power point indicated by the power-voltage characteristics of the whole parallel connection.

17. The image forming apparatus according to claim 10, wherein the matching control unit selects from the plural power generating units a power generating unit whose output to the load is to be stopped in accordance with an operation mode of the image forming apparatus, and gives the adjusting unit an instruction indicating the selected power generating unit.

18. The image forming apparatus according to claim 17, wherein the plural power generating devices include a power generating device provided at a driving portion of the image forming apparatus where the driving state of the driving portion is variable in accordance with the operation mode of the image forming apparatus.

* * * * *